(12) United States Patent
Sasaki et al.

(10) Patent No.: US 7,343,607 B2
(45) Date of Patent: Mar. 11, 2008

(54) DRIVING MECHANISM OF ELECTRONIC INSTRUMENT

(75) Inventors: Takahiro Sasaki, Kawagoe (JP); Akira Shimizu, Kawagoe (JP); Nobumitsu Kasahara, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 239 days.

(21) Appl. No.: 11/054,431

(22) Filed: Feb. 10, 2005

(65) Prior Publication Data

US 2005/0149959 A1  Jul. 7, 2005

Related U.S. Application Data

(62) Division of application No. 10/086,427, filed on Mar. 4, 2002, now abandoned.

(30) Foreign Application Priority Data

Mar. 5, 2001 (JP) .............................. 2001-060577

(51) Int. Cl.
*G11B 33/02* (2006.01)
(52) U.S. Cl. ..................................... 720/646
(58) Field of Classification Search ................ 720/647, 720/646, 612; 360/99.02
See application file for complete search history.

(56) References Cited

U.S. PATENT DOCUMENTS

| 4,530,081 | A | * | 7/1985 | Sakurai et al. ............... 720/647 |
| 4,623,992 | A | | 11/1986 | Kurosaki et al. |
| 5,787,063 | A | * | 7/1998 | Kanno et al. ................. 720/647 |
| 6,055,124 | A | * | 4/2000 | Habara et al. ............ 360/99.02 |
| 6,101,160 | A | * | 8/2000 | Busch et al. ................. 720/647 |

(Continued)

FOREIGN PATENT DOCUMENTS

DE     195 35 678 A1    3/1997

(Continued)

OTHER PUBLICATIONS

Japanese Abstract No. 11321472, dated Nov. 24, 1999.

*Primary Examiner*—Tianjie Chen
(74) *Attorney, Agent, or Firm*—Sughrue Mion, PLLC

(57) ABSTRACT

The driving mechanism has an instrument body formed with a recording medium inserting slot for inserting a recording medium into the instrument body. The driving mechanism moves a first operation unit and a second operation unit between a first position for covering the recording medium inserting slot and a second position for exposing the recording medium inserting slot. The driving mechanism includes a first turnable supporting member turnably fitted to the instrument body for supporting the first operation unit, a first drive device for turning the first turnable supporting member, a second supporting member for supporting the second operation unit, a second turnable supporting member turnably fitted to the instrument body for supporting the second operation unit, and a second drive device for turning the second turnable supporting member. The second drive device supports the second supporting member movably in directions along which the recording medium is inserted and removed through the recording medium inserting slot of the instrument body. The first drive device turns the first turnable supporting member to move the first operation unit between the first position and the second position. The second drive device moves the second supporting member and turns the second turnable supporting member to move the second operation unit between the first position and the second position.

6 Claims, 16 Drawing Sheets

U.S. PATENT DOCUMENTS 6,212,147 B1 * 4/2001 Ishihara ............... 720/612
6,421,310 B1 * 7/2002 Sujino ................ 720/647
6,501,719 B1 * 12/2002 Hada et al. ........... 720/646

FOREIGN PATENT DOCUMENTS

| EP | 0 719 677 A1 | 7/1996 |
| EP | 0 995 635 A2 | 4/2000 |
| EP | 1 110 820 A1 | 6/2001 |
| WO | WO 00/34079 A1 | 6/2000 |

* cited by examiner

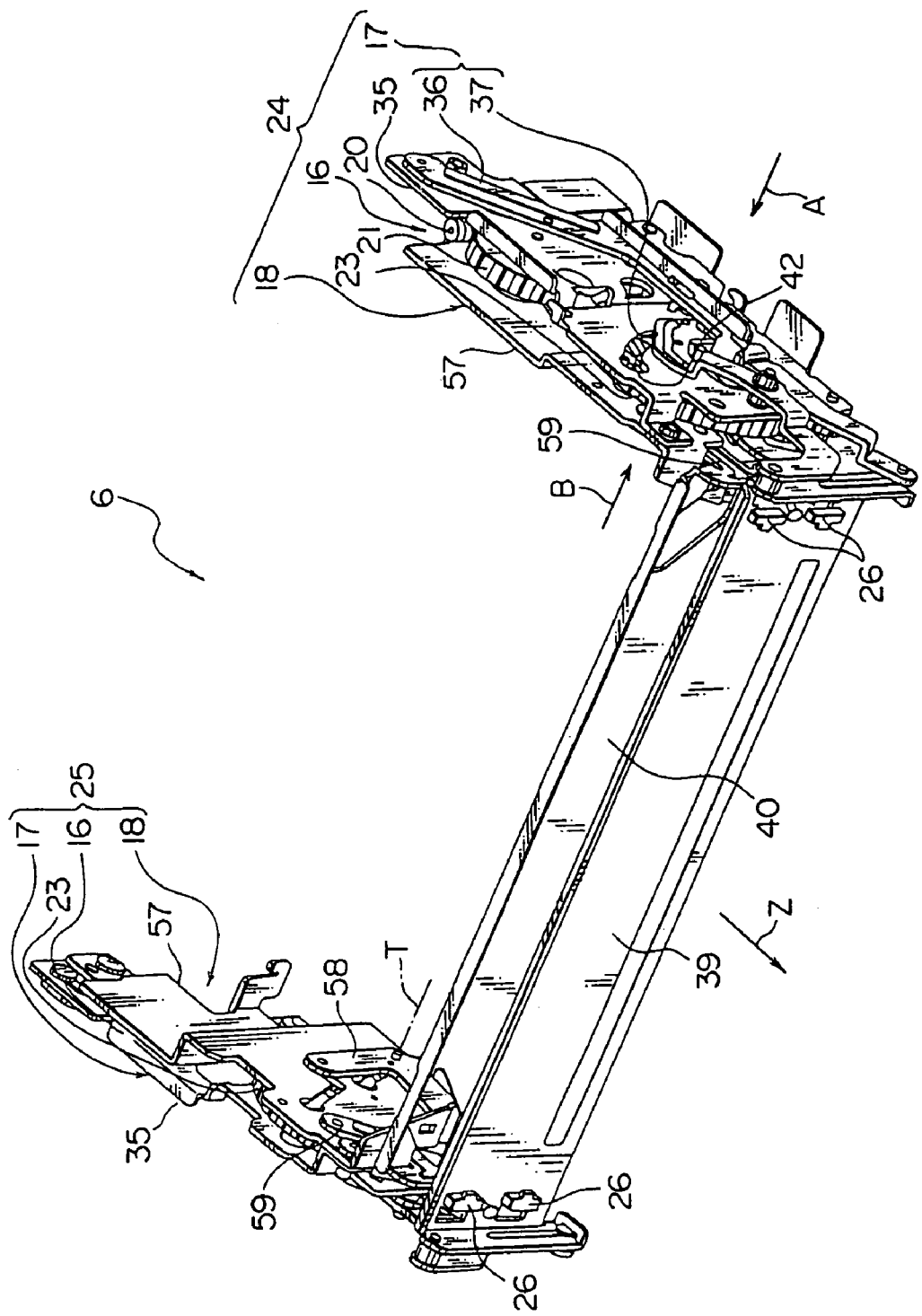

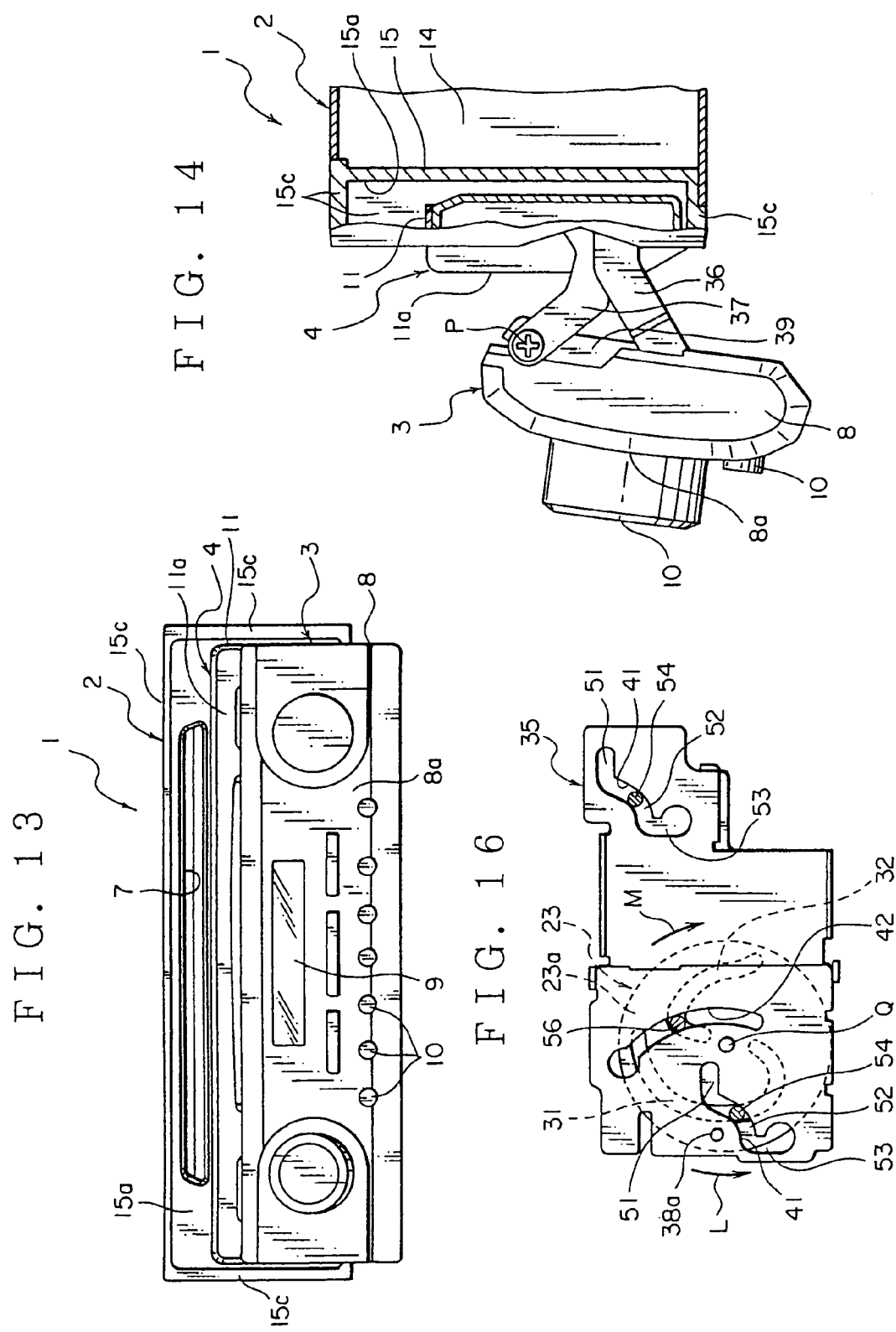

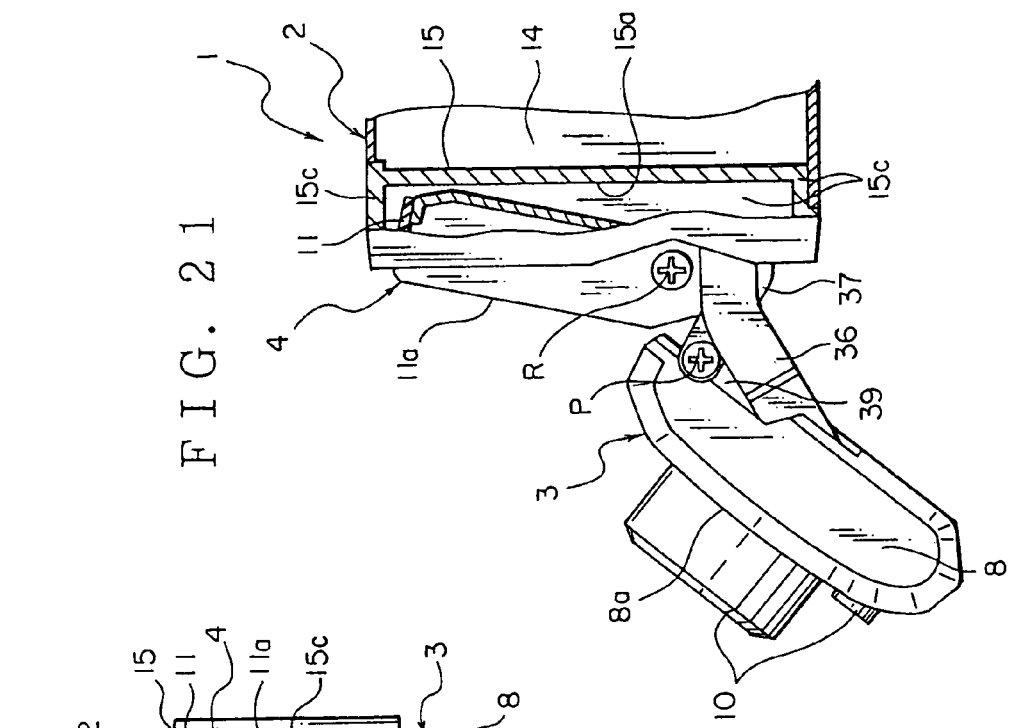
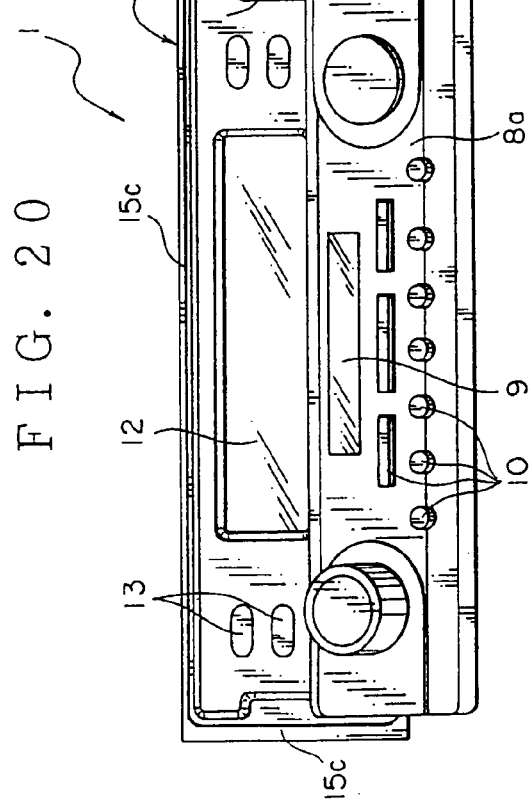
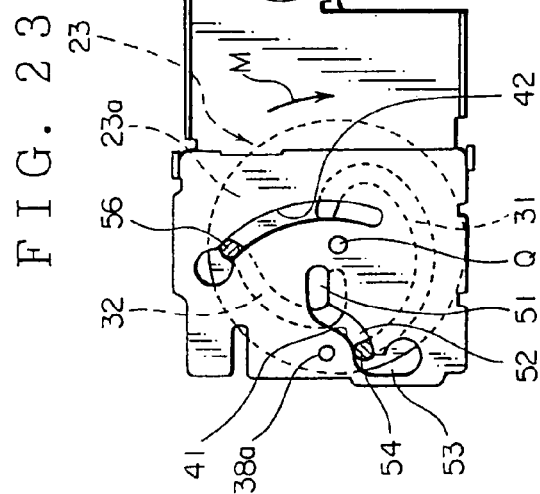

DRIVING MECHANISM OF ELECTRONIC INSTRUMENT

This is a divisional of application Ser. No. 10/086,427 filed Mar. 4, 2002 now abandoned.

BACKGROUND OF THE INVENTION

1. Field of the Invention

The present invention relates to an electronic instrument mounted on a vehicle like a car, particularly to various audio instruments having an operation display unit with an operation switch and a display panel, in which the display unit is moved by a driving mechanism.

2. Related Art

In a car instrument panel, there have been conventionally provided various car audio devices like a compact disc (hereinafter referred to as CD) player, a mini disc (hereinafter referred to as MD), and an AM/FM tuner. In FIG. 28, such an electronic instrument 101 is illustrated, which has a housing accommodating a CD player, an AM/FM tuner, etc.

The electronic instrument 101 of FIG. 28 has an instrument body 102 fitted in an instrument panel and an operation unit 103 movably attached to the instrument body 102. The instrument body 102 defined in a box shape accommodates the AM/FM tuner, the CD player, etc.

The instrument body 102 has a front face 102a (FIG. 29) formed with a recording medium inserting slot 107 to be exposed to a user when mounted in the instrument panel. Through the recording medium inserting slot 107, the CD which is a recording medium can be inserted into and removed from the instrument body 102.

The operation unit 103 has a plurality of switches 4 for tuning AM/FM broadcasting stations and for selection of pieces of music recorded on the CD. The operation unit 103 further has a display panel 105 for displaying a selected broadcasting station and a selected piece of music. The operation unit 103 is attached to the instrument body 102 movably between a first position (FIG. 28) and a second position (FIG. 29). At the first position, the operation unit 103 covers the plane 102a so that the display panel 105 faces the user, and at the second position, the operation unit 103 opens the plane 102a to expose the recording medium inserting slot 107 while the display panel 105 orients generally upward.

The operation unit 103 of the instrument body 102 of FIG. 28 has a first arm 108 (FIG. 30) and a second arm 109 (FIG. 30) via which the operation unit 103 is moved between the first position shown in FIG. 28 and the second position shown in FIG. 29.

A pair of the first arms 108 are provided to be spaced from each other in a lateral direction of the electronic instrument 101. Each first arm 108 is disposed inside a side wall of the instrument body 102 and is turnably supported by the instrument body 102 around an axis along a lateral direction of the electronic instrument 101. The first arm 108 supports an upper end portion of the operation unit 103 turnably around another axis along a lateral direction of the electronic instrument 101.

A pair of the second arms 109 are provided to be spaced from each other in a lateral direction of the electronic instrument 101. Each second arm 109 is disposed inside a side wall of the instrument body 102 and is turnably supported by the instrument body 102 around an axis along a lateral direction of the electronic instrument 101. The second arm 109 supports a lower end portion of the operation unit 103 turnably around another axis along a lateral direction of the electronic instrument 101.

The turning of the first and second arms 108 and 109 around the axes moves the operation unit 103 between the first position shown by chain lines of FIG. 30 and the second position shown by solid lines of FIG. 30. At the second position, the recording medium inserting slot 107 is exposed outward.

At the second position, the user inserts or removes CD through the recording medium inserting slot 107 relative to the instrument body 102. At the first position, the user operates the switches for selection of broadcasting stations and for selection of pieces of music in the use of the AM/FM tuner and the CD player.

The aforementioned conventional electronic instrument 101 moves the operation unit 103 between the first and second positions by the pair of first arms 108 and the pair of second arms 109.

That is, the four arms are required for moving the operation unit 103 between the first and second positions. This increases parts in number and needs a complex driving mechanism to turn the four arms with synchronization thereof, resulted in an increased cost for provision of the parts and for assembling thereof.

Furthermore, the turning of the four arms to move the operation unit 103 causes a reduced moving range of the operation unit 103 due to limited lengths of the arms. Thus, a plane 102a of the instrument body 102 is limitedly exposed when the operation unit 103 opens the recording medium inserting slot 107. It has been difficult to provide another recording medium inserting slot for insertion of a MD in the plane 102a in addition to the CD inserting slot 107.

As illustrated in FIG. 31, when the display panel 105 is arranged in the plane 102a of the instrument body 102, the limited exposed area of the plane 102a can not provide a broader area to sufficiently visually recognize an operation status of the instrument.

SUMMARY OF THE INVENTION

In view of the aforementioned disadvantages of the conventional art, a first object of the invention is to provide a driving mechanism of an instrument which can reduce the instrument in number of parts and in manufacturing cost. A second object of the invention is to provide a driving mechanism which allows a sufficient recognition of an operation status of the instrument.

For achieving the first object of the invention, a driving mechanism of a first aspect of the present invention is a driving mechanism of an electronic instrument having an instrument body formed with a recording medium inserting slot for inserting a recording medium into the instrument body, the driving mechanism moving a first operation unit between a first position for covering the recording medium inserting slot and a second position for exposing the recording medium inserting slot, the driving mechanism comprising:

a supporting member extended from the first operation unit into the instrument body, a guide portion mounted in the instrument body for guiding the first operation unit via the supporting member to move the first operation unit between the first position and the second position, the guide portion movably receiving an end of the supporting member, and a first drive device for moving the supporting member along the guide portion.

A second aspect of the present invention is the driving mechanism according to the first aspect. The driving mechanism further comprises a first turnable supporting member turnably fitted to the instrument body for supporting the first operation unit wherein the first drive device turns the first turnable supporting member to move the first operation unit between the first position and the second position.

A third second aspect of the present invention is the driving mechanism according to the second aspect. The first drive device includes:

a first projecting piece projecting from the first turnable supporting member, a gear turned by a drive motor and formed with a first groove, and a guide hole through which the first projecting piece passes such that the first projecting piece is received in the first groove, wherein the gear turns so that the first groove moves the first projecting piece along the first guide hole to move the first operation unit between the first position and the second position.

For achieving the second object of the invention, a fourth aspect of the present invention is a driving mechanism of an electronic instrument having an instrument body formed with a recording medium inserting slot for inserting a recording medium into the instrument body, the driving mechanism moving a second operation unit between a first position for covering the recording medium inserting slot and a second position for exposing the recording medium inserting slot, the driving mechanism comprising:

a second supporting member for supporting the second operation unit, a second turnable supporting member turnably fitted to the instrument body for supporting the second operation unit, and a second drive device for turning the second turnable supporting member, the second drive device supporting the second supporting member movably in directions along which the recording medium is inserted and removed, wherein the second drive device moves the second supporting member and turns the second turnable supporting member to move the second operation unit between the first position and the second position.

A fifth aspect of the present invention is the driving mechanism according to the fourth aspect. The second drive device includes:

a second projecting piece projecting from the second supporting member, a third projecting piece projecting from the second turnable supporting member, a gear turned by a drive motor, the gear formed with a second groove and a third groove, a second guide hole through which the second projecting piece passes such that the second projecting piece is received in the second groove, and a third guide hole through which the third projecting piece passes such that the third projecting piece is received in the third groove, wherein the gear turns so that the second groove moves the second projecting piece along the second guide hole and the third groove moves the third projecting piece along the third guide hole to move the second operation unit between the first position and the second position.

For achieving the second object of the invention, a sixth aspect of the present invention is a driving mechanism of an electronic instrument having an instrument body formed with a recording medium inserting slot for inserting a recording medium into the instrument body, the driving mechanism moving a first operation unit and a second operation unit between a first position for covering the recording medium inserting slot and a second position for exposing the recording medium inserting slot, the driving mechanism comprising:

a first turnable supporting member turnably fitted to the instrument body for supporting the first operation unit, a first drive device for turning the first turnable supporting member, a second supporting member for supporting the second operation unit, a second turnable supporting member turnably fitted to the instrument body for supporting the second operation unit, and a second drive device for turning the second turnable supporting member, the second drive device supporting the second supporting member movably in directions along which the recording medium is inserted and removed through the recording medium inserting slot of the instrument body, wherein the first drive device turns the first turnable supporting member to move the first operation unit between the first position and the second position, and the second drive device moves the second supporting member and turns the second turnable supporting member to move the second operation unit between the first position and the second position.

A seventh aspect of the present invention is the driving mechanism according to the sixth aspect. The first drive device includes:

a first projecting piece projecting from the first turnable supporting member, a gear turned by a drive motor, the gear having a face formed with a first groove, and a first guide hole through which the first projecting piece passes such that the first projecting piece is received in the first groove, and the second drive device includes:

a second projecting piece projecting from the second supporting member, a third projecting piece projecting from the second turnable supporting member, a second groove and a third groove which are formed in another face of the gear, a second guide hole through which the second projecting piece passes such that the second projecting piece is received in the second groove, and a third guide hole through which the third projecting piece passes such that the third projecting piece is received in the third groove, wherein the gear turns so that the first groove moves the first projecting piece along the first guide hole and the second groove moves the second projecting piece along the second guide hole while the third groove moves the third projecting piece along the third guide hole to move the first operation unit and the second operation unit between the first position and the second position.

Next, operations and effects of the present invention will be discussed.

In the first aspect of the present invention, the supporting member extended from the first operation unit into the instrument body and the guide portion receiving the end of the supporting member are provided to move the first operation unit between the first position and the second position. The simple configuration of the supporting member and the guide portion allows the movement of the first operation unit. This eliminates an increase in number of parts and in a manufacturing cost thereof.

In the second aspect of the present invention, the first turnable supporting member is provided in addition to the supporting member and the guide portion. When the first turnable supporting member is provided at each lateral end of the first operation unit, the provision of a pair of the first turnable supporting members can move the first operation unit. In the meantime, the supporting member extended from the first operation unit into the instrument body is guided by the guide portion. This eliminates an increase in number of parts and in a manufacturing cost thereof.

In the third aspect of the present invention, the first projecting piece projected from the first turnable supporting member is received in the first groove formed in the gear through the first guide hole. The turning of the gear moves the first projecting piece along the first guide hole so that the first operation unit can move between the first position and the second position. Thus, the first operation unit reliably moves between the first position and the second position. This eliminates an increase in a manufacturing cost thereof.

In the fourth aspect of the present invention, the second supporting member is moved by the second drive device. The turning of the second drive device moves the second operation unit from the first position toward the second position. Thus, the second operation unit and one surface of the instrument body can be exposed. This provides a broader display area when a display panel is arranged on the second operation unit and on the surface of the instrument body. Thus, the user can visually recognize information on the display panel so as to know well an operation status of the electronic instrument.

In the fifth aspect of the present invention, the second projecting piece projected from the second supporting member is received in the second groove formed in the gear through the second guide hole. Furthermore, the third projecting piece projected from the second turnable supporting member is received in the third groove formed in the gear through the third guide hole.

The turning of the gear can move the second projecting piece along the second guide hole and can move the third projecting piece along the third guide hole so that the second operation unit reliably moves between the first position and the second position. Thus, the second operation unit and one surface of the instrument body can be exposed. This provides a broader display area when a display panel is arranged on the second operation unit and on the surface of the instrument body. Thus, the user can visually recognize information on the display panel so as to know well an operation status of the electronic instrument.

In the sixth aspect of the present invention, the two operation units associated with the instrument body can be moved by the single gear. This can reduce the instrument in number of parts and in manufacturing cost thereof. The simple configuration of the single gear can move the two operation units between first position and the second position. Since the two operation units are exposed for the user, the display panel can be arranged on both the operation units in addition to the surface of the instrument body, allowing a broader display area. Thus, the user can visually recognize information on the display panels so as to know well an operation status of the electronic instrument.

In the seventh aspect of the present invention, the two operation units associated with the instrument body can be moved by the single gear. This can reduce the instrument in number of parts and in manufacturing cost thereof. The simple configuration of the single gear can move the two operation units between first position and the second position. Since the two operation units are exposed for the user, the display panel can be arranged on both the operation units in addition to the surface of the instrument body, allowing a broader display area. Thus, the user can visually recognize information on the display panels so as to know well an operation status of the electronic instrument.

BRIEF DESCRIPTION OF THE DRAWINGS

FIG. 6 is a front view showing the electronic instrument of FIG. 1, in which the first operation unit and the second operation unit have moved to the first position;

FIG. 7 is a side view partially in section showing the electronic instrument of FIG. 1, in which the first operation unit and the second operation unit have moved to the first position;

FIG. 8 is a perspective view showing the electronic instrument of FIG. 1, in which a first holder and a second holder have moved to the first position;

FIG. 9 is a side view taken along arrow A of FIG. 8 to show a second frame and a cam gear with the relative positions thereof;

FIG. 13 is a front view showing the electronic instrument of FIG. 1, in which the first operation unit and the second operation unit have moved to the second position;

FIG. 14 is a side view partially in section showing the electronic instrument of FIG. 1, in which the first operation unit and the second operation unit have moved to the second position;

FIG. 16 is a side view taken along arrow C of FIG. 15 to show the second frame and the cam gear with the relative positions thereof;

FIG. 20 is a front view of the electronic instrument of FIG. 1, in which the first operation unit and the second operation unit have moved to the third position;

FIG. 21 is a side view partially in section showing the electronic instrument of FIG. 1, in which the first operation unit and the second operation unit have moved to the third position;

FIG. 23 is a side view taken along arrow E of FIG. 22 to show the second frame and the cam gear with the relative positions thereof;

DETAILED DESCRIPTION OF PREFERRED EMBODIMENTS

Referring to FIGS. 1 to 26, an electronic instrument 1 having a driving mechanism of an embodiment according to the present invention will be discussed. The electronic instrument 1 illustrated in FIG. 1 is mounted, e.g. in an instrument panel of a car which is one of vehicles.

The electronic instrument 1 includes a compact disk (hereinafter referred to as CD) player, an AM/FM tuner, etc. The CD player receives a CD serving as a recording medium to reproduce information recorded on the CD as sound. The AM/FM tuner receives AM/FM broadcasting radio waves to output them as sound.

Figure 1:
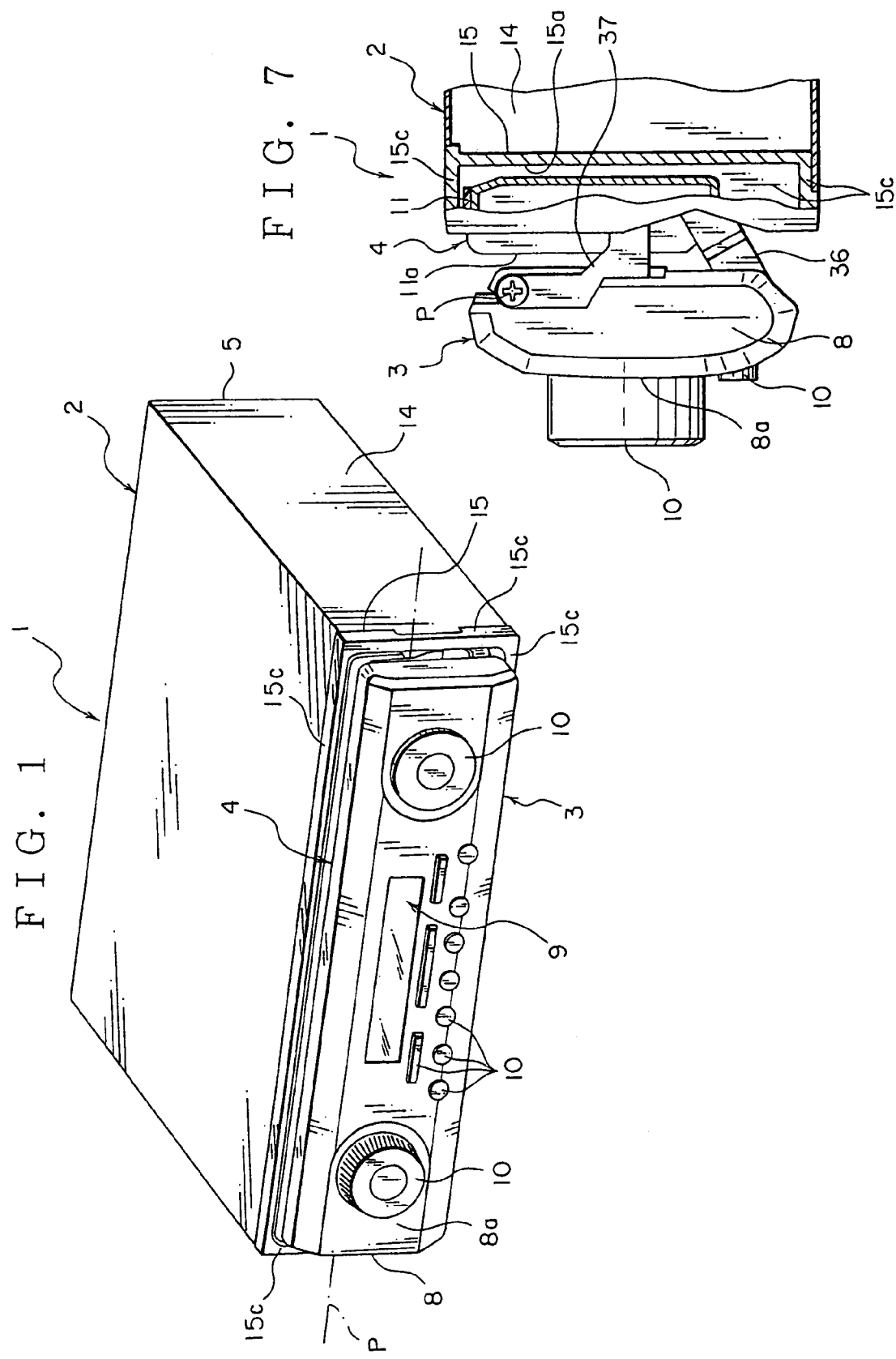
FIG. 1 is a perspective view showing an electronic instrument having a driving mechanism according to an embodiment of the present invention.
Figure 2:
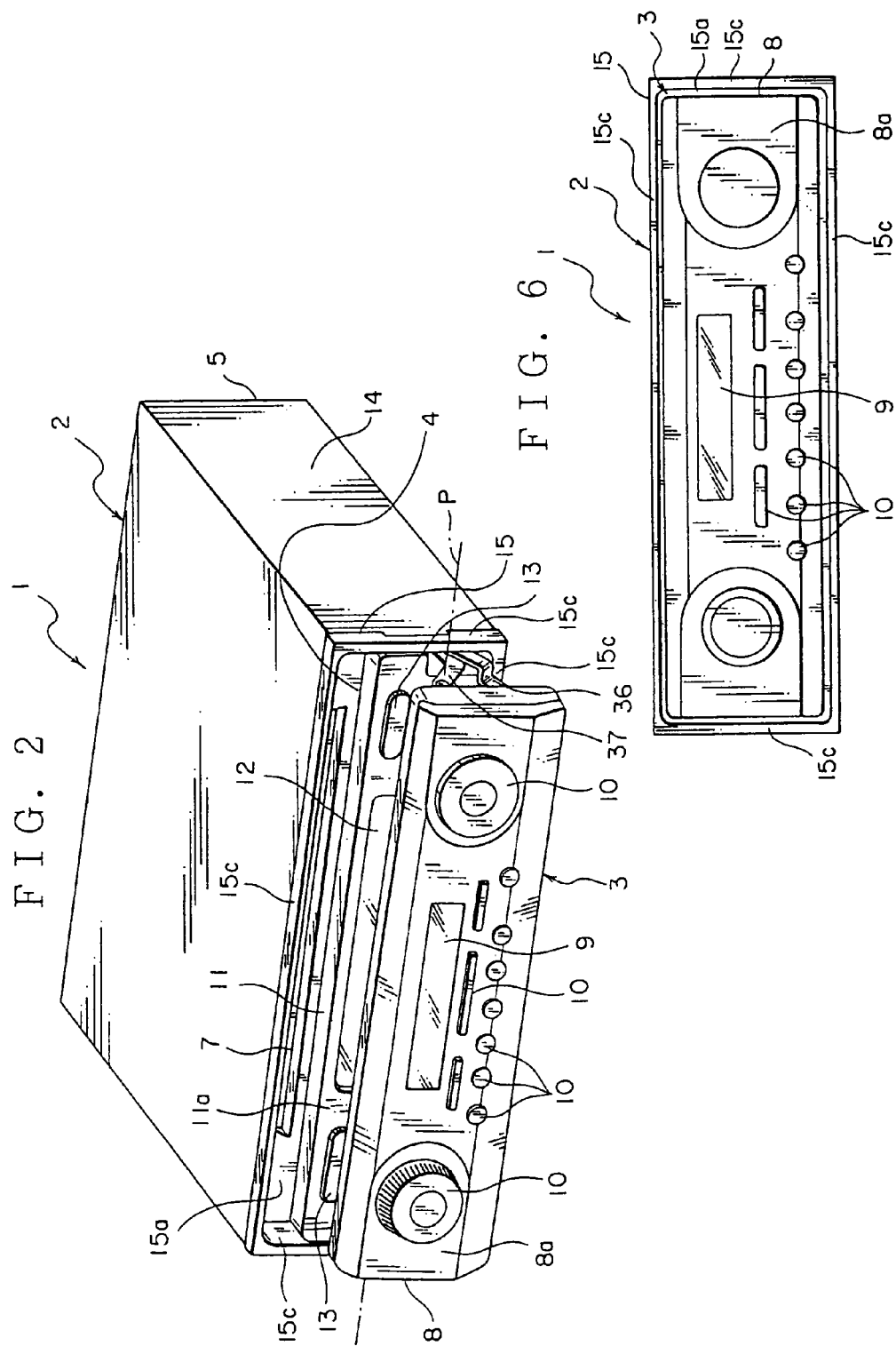
FIG. 2 is a perspective view showing the electronic instrument of FIG. 1, in which a first operation unit and a second operation unit have moved to the second position.
Figure 3:
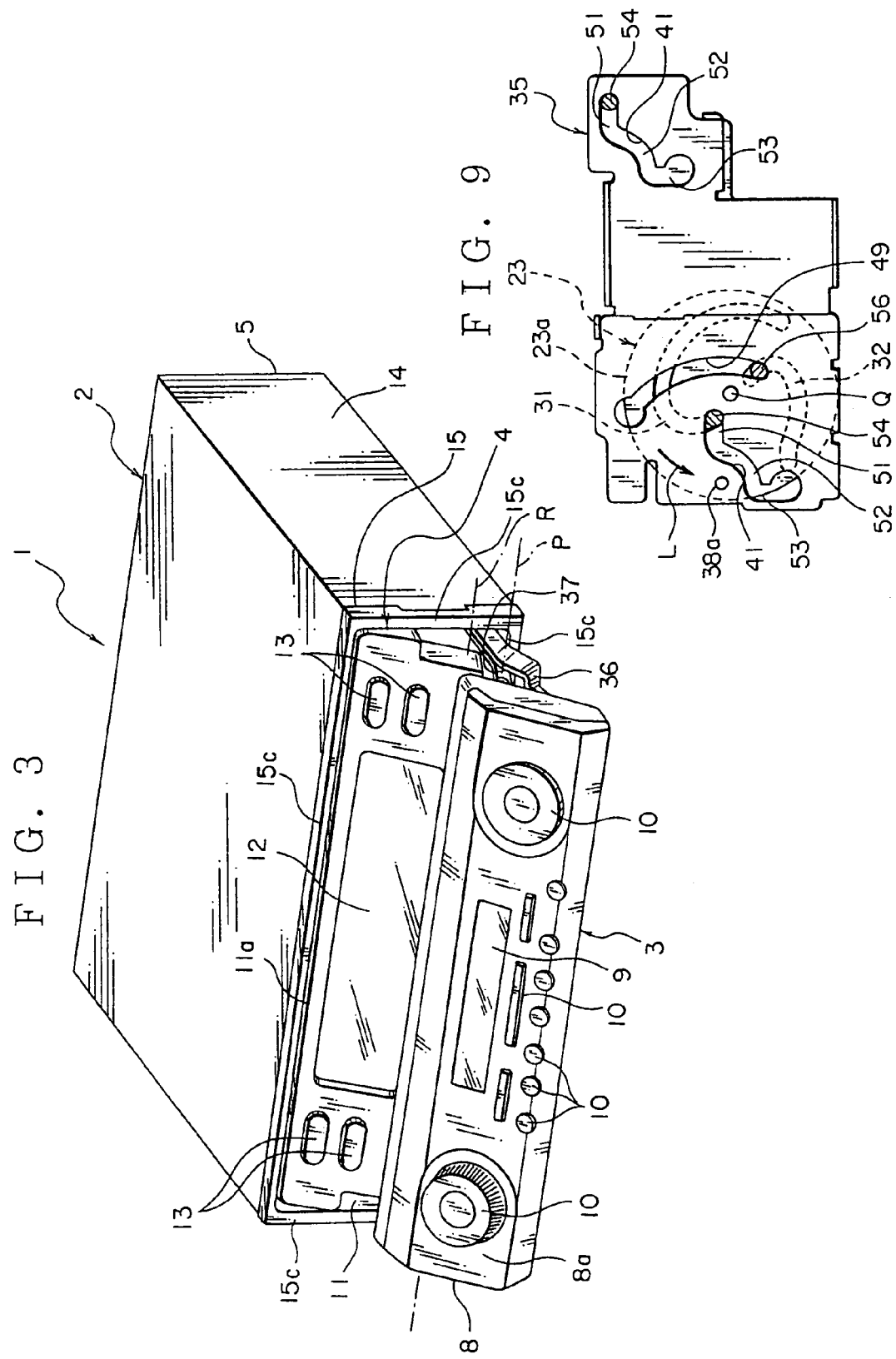
FIG. 3 is a perspective view showing the electronic instrument of FIG. 1, in which the first operation unit and the second operation unit have moved to the third position.

As illustrated in FIGS. 1 to 3, the electronic instrument 1 has an instrument body 2, a second operation unit 3, a first operation unit 4, and a driving mechanism 6 (FIGS. 4 and 5) which is an embodiment according to the invention. The instrument body 2 is provided with a box-like chassis 5 having a short height, which accommodates the CD player, the AM/FM tuner, etc.

Figure 4:
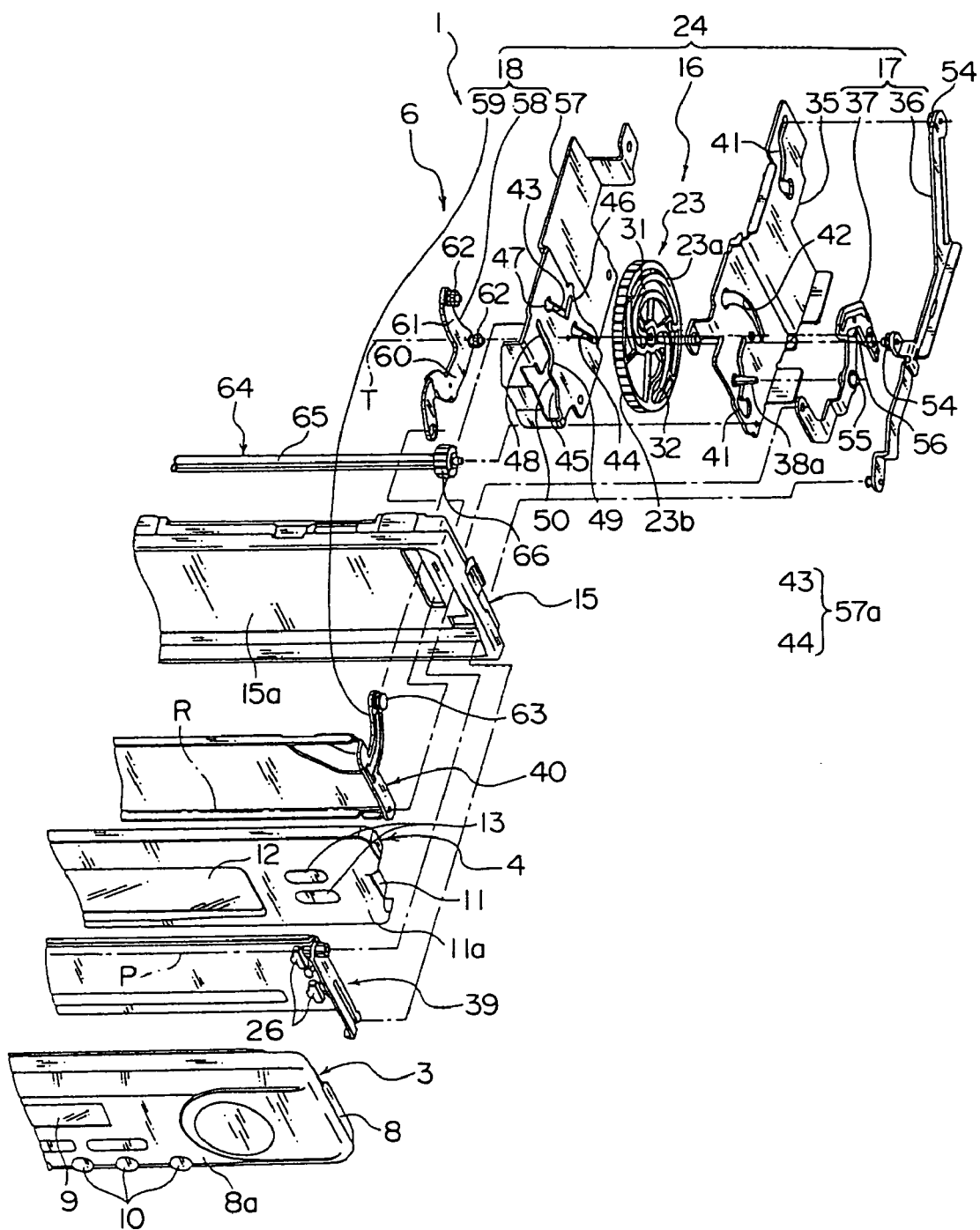
FIG. 4 is an exploded perspective view showing a first driving unit of the driving mechanism of FIG. 1.

The chassis 5 has a chassis body (casing) 14, a front panel 15 disposed at a front side of the chassis body 14, a pair of first frames 57 (FIG. 4), and a pair of second frames 35 (FIG. 4). The chassis body 14 is mounted in the instrument panel. The front panel 15 is made from a metal sheet.

The front panel 15 has a recording medium inserting slot 7 (FIG. 2) in a front surface 15a for inserting a CD into the instrument body 2 and for removing the CD from the instrument body 2.

The front panel 15 has a plurality of vertical walls 15c each unitarily formed with an edge of the front panel 15. A space defined by the vertical walls 15c receives the second operation unit 3 and the first operation unit 4 at a first position described later. The surface 15a of the front panel 15 constitutes one outer surface of the instrument body.

The CD player and the AM/FM tuner, which are received in the chassis 5, operate when the user presses switches 10 and 13 of the second operation unit 3 and the first operation unit 4.

The pair of first frames 57 each of which is a flat metal plate are spaced from each other in a lateral direction of the instrument body 2. Each first frame 57 is raised from a bottom wall of the chassis body 14 to be secured to the chassis body 14.

As illustrated in FIG. 4, each first frame 57 is positioned inside a cam gear 23 described later within the instrument body 2 in a lateral direction of the instrument body 2. Thus, the first frame 57 is opposed to one face 23b of the cam gear 23. Between the first frame 57 and the second frame 35, there are arranged a gears 21, a gear 22, and a cam gear 23 as described later.

Figure 11:
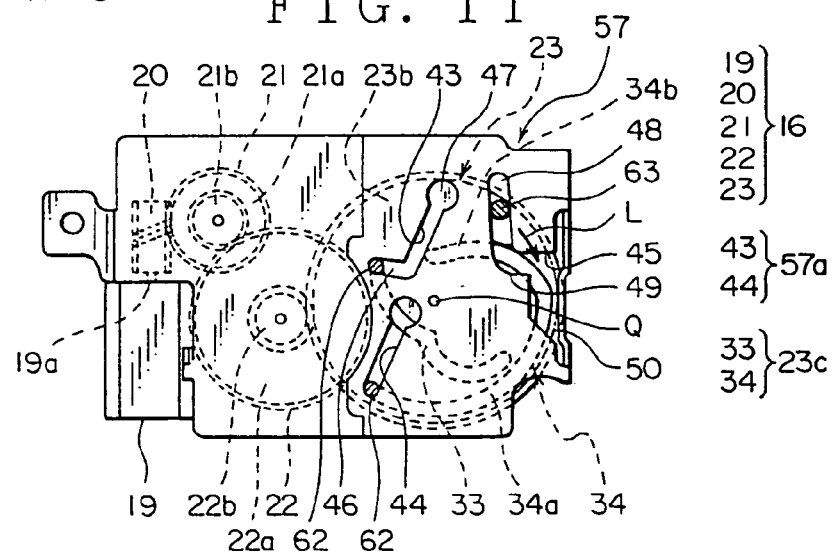
FIG. 11 is a side view taken along arrow B of FIG. 8 to show a first frame and the cam gear with the relative positions thereof.

The first frame 57 has a first guide hole 57a and a supporting hole 45 corresponding to the guide portion described in claim 1 of the specification as illustrated in FIG. 11.

The first guide hole 57a has holes 43 and 44 through which the first frame 57 is extended. The holes 43 and 44 are generally aligned with each other vertically.

The hole 43 which is positioned above the hole 44 has an arc segment 46 and a slope segment 47. The arc segment 46 is located generally at a middle of the first frame 57 to extend from a side of the front panel 15 of the instrument body 2 inwardly in the instrument body 2. The slope segment 47 is contiguous with an end of the arc segment 46 located in the side of front panel 15.

The slope segment 47 is oriented diagonally relative to a vertical direction and to a horizontal direction to extend diagonally upward from the arc segment 46 toward the side of the front panel 15.

The hole 44 is oriented diagonally relative to a vertical direction and to a horizontal direction to extend diagonally upward toward the side of the front panel 15. The hole 44 is parallel to the slope segment 47 of the hole 43.

The supporting hole 45 which penetrates through the first frame 57 is located near an end of the first frame 57 at a side of the front panel 15. The supporting hole 45 has a first vertical segment 48, a horizontal portion 49, and a second vertical portion 50 which are sequentially positioned along a direction from a middle of the first frame 57 toward an end of the first frame 57 located in the side of the front panel 15.

The first vertical segment 48 extends generally vertically from a side around an end portion of the first frame 57 to a side of a middle of the first frame 57. The first vertical segment 48 is slightly inclined relative to an upward vertical direction so as to gradually come inward within the instrument body 2. The horizontal portion 49 is contiguous with a lower end of the first vertical segment 48. The horizontal portion 49 extends horizontally from the first vertical segment 48 to reach an end the horizontal portion 49 at a side of the front panel 15. The second vertical portion 50 is contiguous with the end of the horizontal portion 49 and extends downward. The second vertical portion 50 is opened at an edge of the first frame 57 in the side of the front panel 15.

The pair of second frames 35 each of which is a flat metal plate are spaced from each other in a lateral direction the electronic instrument 1. Each first frame 57 is raised from the bottom wall of the chassis body 14 to be secured to the chassis body 14.

As illustrated in FIG. 4, each second frame 35 is positioned outside the cam gear 23 within the instrument body 2 in a lateral direction of the instrument body 2. Thus, the first frame 57 is opposed to the other face 23a of the cam gear 23.

Figure 5:
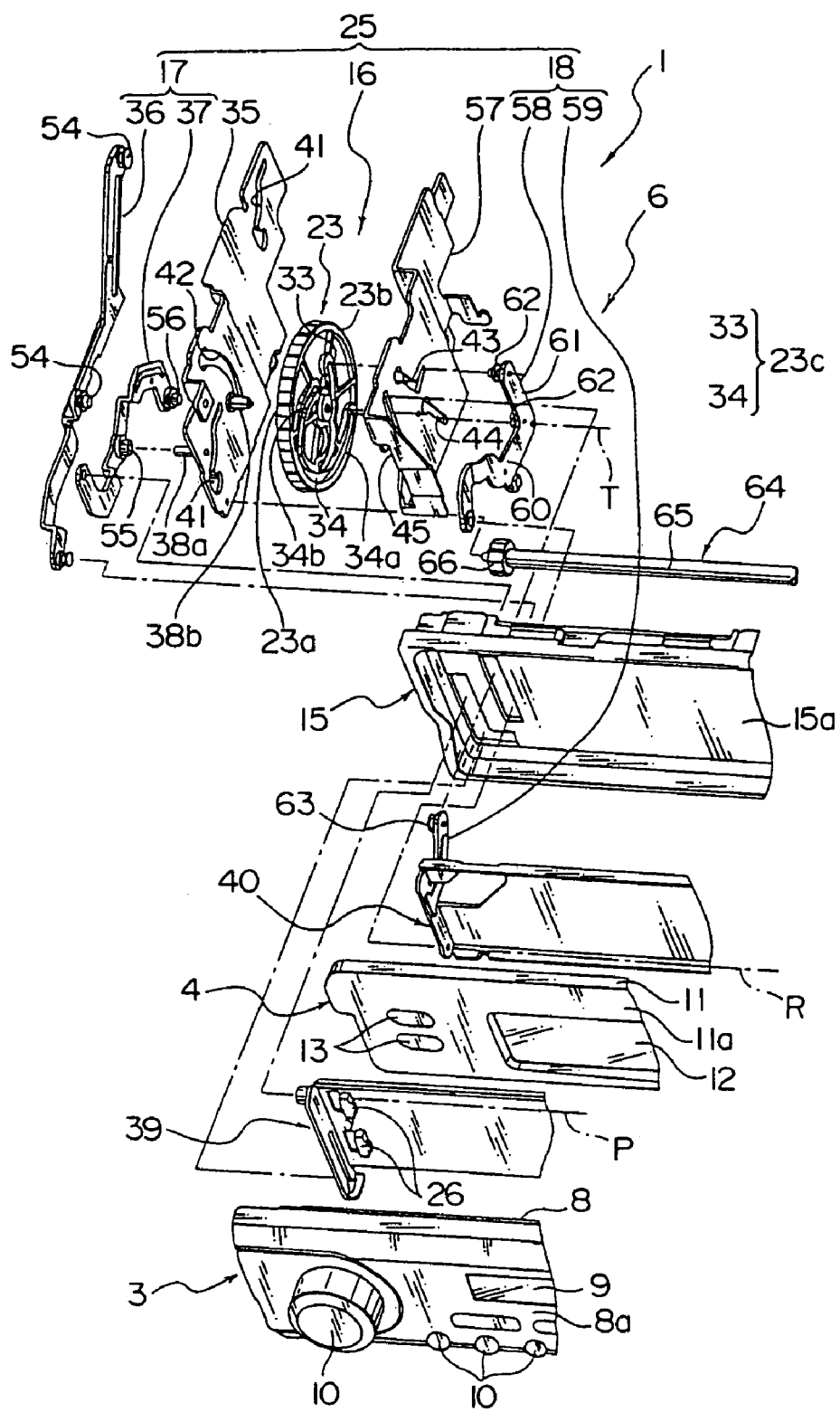
FIG. 5 is an exploded perspective view showing a second driving unit of the driving mechanism of FIG. 1.

As illustrated in FIGS. 4, 5, and 9, the second frame 35 has a pair of second guide holes 41 and a third guide hole 42. The second frame 35 further has supporting pins 38a and 38b. The second guides hole 41 and the third guide hole 42 penetrate the second frame 35. As illustrated in FIG. 9, the second guide hole 41 extends generally inward within the instrument body 2 from an end positioned at a side of the front panel 15 to the other end thereof.

As illustrated in FIG. 9, each second guide hole 41 has a horizontal segment 51, an arc segment 52, and a vertical portion 53 which are sequentially positioned along a direction from an inner side of the instrument body 2 toward a side of the front panel 15. The horizontal segment 51 is extended horizontally, and the arc segment 52 is contiguous with the horizontal segment 51. The arc segment 52 is an arc in a plain. The vertical portion 53 is contiguous with the arc segment 52 to extend from the arc segment 52 downward.

The third guide hole 42 is an arc having a curvature center at the supporting pin 38a. The supporting pin 38a is positioned at a side end portion of the second frame 35 in the side of the front panel 15. The supporting pin 38a is projected from the second frame 35 to extend in a lateral direction of the instrument body 2 outward within the chassis body 14.

As illustrated in FIG. 5, the supporting pin 38b is projected from the second frame 35 to extend in a lateral direction of the instrument body 2 inward within the chassis body 14. The supporting pin 38b is inserted into the cam gear 23 at the rotating center Q of the cam gear 23 to turnably support the cam gear 23.

As illustrated in FIGS. 1 to 6, 13, and 20, the instrument body 2 has a housing 8 which is a flat box having a short height, a liquid crystal display 9 (referred to as LCD hereinafter) which is a display panel received in the housing 8, and some types of switches. The housing 8 has a breadth and a height generally the same as those of the chassis 5.

The LCD 9 has an area to display various kinds of information for the user. Switches 10 constitute an operation section for the user. The display area and the operation section are located on an face 8a of a front side of the housing 8 as illustrated in FIG. 1. The face 8a is exposed outward so that the exposed face 8a is referred to as an exposed surface hereinafter.

The user operates the switch 10 positioned on the second operation unit 3, e.g. to select a broadcasting station to receive associated radio waves by the AM/FM tuner. At the same time, the LCD 9 of the second operation unit 3 displays information such as a selected wave frequency and an associated broad station.

The second operation unit 3 is removably attached to a second holder 39 (FIGS. 4 and 5) discussed later of the driving mechanism 6.

In the illustrated example, at each side end of the rear face opposed to the exposed face 8a of the second operation unit 3, there is provided a groove (not shown). The groove engages with a locking hook 26 (FIG. 8) formed on the second holder 39. The engagement of the groove with the locking hook 26 fully receives the second operation unit 3 in the second holder 39. The disengagement of the locking hook 26 from the groove removes the second operation unit 3 from the second holder 39.

As illustrated in FIGS. 3 to 5 and 20, the first operation unit 4 has a housing 11 which is a flat box having a short height, a liquid crystal display 12 (referred to as LCD hereinafter) which is a display panel received in the housing 11, and some types of switches 13. The housing 11 has a breadth and a height which are respectively slightly smaller than the inside dimensions of the vertical wall 15c of the chassis 5 of the instrument body 2.

The LCD 12 has an display area to display various kinds of information for the user. The switches 13 constitute an operation section for the user. The display area and the operation section are located on a face 11a of a front side of the housing 11 as illustrated in FIG. 20. The face 11a is exposed outside so that the exposed face 11a is referred to as an exposed surface hereinafter.

For example, the operation of the switches 13 on the first operation unit 4 by the user can select a piece of music to be reproduced by the CD player, and the LCD 12 of the first operation unit 4 displays information such as a track number of the selected music on the LCD 12.

The second operation unit 3 and the first operation unit 4 are moved by the driving mechanism 6 to the first position of FIG. 1, the second position of FIG. 2, and the third position of FIG. 3. In this embodiment, the driving mechanism 6 moves the second operation unit 3 and the first operation unit 4 sequentially to the first to third positions. The driving mechanism 6 also moves the second operation unit 3 and the first operation unit 4 sequentially to the third to first positions.

At the first position, the exposed faces 8a and 11a of the second operation unit 3 and the first operation unit 4 are positioned parallel to and spaced from each other in a direction perpendicular to the surface 15a of the front panel 15. The first operation unit 4 is positioned between the second operation unit 3 and the front surface 15a. The first operation unit 4 is received in a space surrounded by the vertical walls 15c and the front surface 15a. At the first position, the exposed faces 8a and 11a of the second operation unit 3 and the first operation unit 4 face forward relative to the instrument body 2, while the second operation unit 3 and the first operation unit 4 are covering the recording medium inserting slot 7.

At the second position, the second operation unit 3 and the first operation unit 4 is moved downward from the first position to expose the recording medium inserting slot 7. When the second operation unit 3 moves from the first position to the second position, the second operation unit 3 initially is moved forward relative to the instrument body 2 perpendicular to the surface 15a of the front panel 15 before moved downward toward the second position. The second operation unit 3 is moved further forward from the state shown in FIG. 2, in which the second operation unit 3 is turned so that the exposed face 8a is oriented slightly upward.

At the third position, the second operation unit 3 has moved downward from the second position, while the display surface of the LCD 9, i.e. the exposed face 8a is turned to orient further upward. In the mean time, the second operation unit 3 is moved upward from the second position, while the display surface of the LCD 12, i.e. the exposed face 11a is turned to orient upward. The operation section of the second operation unit 3 having the display surface of the LCD 9 and the switch 10 is exposed in front of the surface 15a of the front panel 15 as well as the operation section of the first operation unit 4 having the display surface of the LCD 12 and the switches 13.

Thus, at the third position, since the exposed faces 8a and 11a of the second operation unit 3 and the first operation unit 4 are exposed outward, the user can visually recognize information displayed on the display surfaces and can operate the switches provided on the exposed faces 8a and 11a. The exposed face 11a of the first operation unit 4 is positioned above the exposed face 8a of the second operation unit 3. At the third position, since the exposed faces 8a and 11a of the second operation unit 3 and the first operation unit 4 are oriented upward, the user can surely carry out the information recognition and the switch operation described above.

The driving mechanism 6 has a first driving unit 24 (FIG. 4) and a second driving unit 25 (FIG. 5). The first driving unit 24 and the second driving unit 25 move a second holder 39 and a first holder 40. The second holder 39 and the first holder 40 are each a metal plate bar. The second holder 39 and the first holder 40 each are elongated in a lateral direction of the instrument body 2 and are slightly smaller than the front panel 15.

The second operation unit 3 is removably attached to the second holder 39 which has four locking hooks 26 as illustrated in FIGS. 4, 5, and 8. A pair of the locking hooks 26 are fitted to each side end of the second holder 39 to be spaced from each other in a vertical direction of the instrument body 2. Each locking hook 26 is resiliently biased toward a center of the second holder 39 by a torsion spring.

The locking hook 26 engages with a groove (not shown) of the second operation unit 3 to fit the second operation unit 3 to the second holder 39. The user can disengage the locking hook 26 from the groove by moving the second operation unit 3 downward relative to the second holder 39, so that the second operation unit 3 is removed from the second holder 39.

The first operation unit 4 is attached to the first holder 40. Note that the first operation unit 4 and the first holder 40 correspond to the first operation unit described in claims of the specification, and the second operation unit 3 and the second holder 39 correspond to the second operation unit described in claims.

The first and second driving units 24 and 25 are received in the chassis body 14 to be secured respectively to the first frame 57 or the second frame 35 of the chassis 5. The first and second driving units 24 and 25 are spaced from each other in a lateral direction of the instrument body 2 and are positioned respectively at each side end portion of the instrument body 2.

Next, the first driving unit 24 will be discussed, and the second driving unit 25 having generally the same configuration as the first driving unit 24 will not be discussed. The same reference numerals as the first driving unit 24 are applied for the same members of the second driving unit 25. The first driving unit 24 has a primary driving unit 16 (FIG. 11), a first drive section 18 (FIG. 4), and a second drive section 17 (FIG. 4).

As illustrated in FIG. 11, the primary driving unit 16 has the drive motor described in the claims, which includes a motor 19, a worm 20, a worm gear 21, and a transmission gear 22. The primary driving unit 16 further has a cam gear 23 corresponding to the gear described in the claims. The motor 19 has an output shaft 19a which allows a normal and reverse rotation thereof. The motor 19 is secured on both the second frame 35 (FIG. 9) and the first frame 57.

The worm 20 is fitted to the output shaft 19a of the motor 19. The worm gear 21 has co-axially a larger diameter gear portion 21a and a smaller diameter gear portion 21b unitarily. The worm gear 21 is positioned between the second frame 35 and the first frame 57 so as to be turnably supported by them. The larger diameter gear portion 21a of the worm gear 21 engages with the worm 20.

The transmission gear 22 has coaxially a larger diameter gear portion 22a and a smaller diameter gear portion 22b unitarily. The transmission gear 22 is positioned between the second frame 35 and the first frame 57 so as to be turnably supported by them. The larger diameter gear portion 22a of the transmission gear 22 engages with the smaller diameter gear portion 21b of the worm gear 21.

The cam gear 23 is positioned between the second frame 35 and the first frame 57 so as to be turnably supported by them. The cam gear 23 engages with the smaller diameter gear portion 22b of the transmission gear 22.

The turning central axes of the gears 21, 22, and 23 are oriented respectively along a lateral direction of the instrument body 2 of FIG. 1, while each face of the gears 21, 22, and 23 is parallel to a longitudinal direction the instrument body 2 of FIG. 1.

The cam gear 23 is formed with a first groove 23c in one face 23b facing laterally inward in the chassis body 14 of the instrument body 2 as illustrated in FIG. 11. The first groove 23c has a cam groove 33 and a cam groove 34 which are defined in the face 23b.

As illustrated in FIG. 11, the cam groove 33 extends in a generally radial direction of the cam gear 23 to a side near the turning center Q of the cam gear 23. The cam groove 33 is slightly curved to define an arc having a radius center at the turning center Q.

As illustrated in FIG. 11, the cam groove 34 has an arc segment 34a having a radius center at the turning center Q of the cam gear 23 and a spiral portion 34b contiguous with the arc segment 34a. The arc segment 34a is positioned near a periphery of the cam gear 23. The spiral portion 34b extends to come gradually near the turning center Q of the cam gear 23 from the arc segment 34a.

The cam gear 23 is formed with a second groove 31 and a third groove 32 in the other face 23a facing laterally outward in the chassis body 14 of the instrument body 2 as illustrated in FIG. 9.

As illustrated in FIG. 9, the second groove 31 and the third groove 32 respectively extend spirally around the turning center Q of the cam gear 23. The second groove 31 and the third groove 32 are generally symmetrical relative to the turning center Q of the cam gear 23 in position and shape thereof. The second groove 31 and the third groove 32 respectively extend spirally to come gradually near a periphery of the cam gear 23 from its inner end positioned in the side of the turning center Q.

In the primary driving unit 16 described above, the rotational driving force of the motor 19 turns the cam gear 23 counterclockwise along arrow L of FIG. 9 and clockwise along arrow M of FIG. 16.

As illustrated in FIG. 4, the first drive section 18 has a first arm 58 as a first turnable supporting member, a supporting arm 59 as a supporting member, the first guide hole 57a, and the supporting hole 45.

The first arm 58 is positioned along a lateral direction of the instrument body 2 inside the first frame 57 within the chassis body 14. The first arm 58 has an arm portion 60 extended inward from a side of the front panel 15 of the instrument body 2. The first arm 58 further has a vertical portion 61 extended vertically.

The arm portion 60 has an end supporting an lower end of the first holder 40 at a side of the front panel 15. The arm portion 60 supports the lower end of the first holder 40 turnably around a turning axis R (shown by a chain line in FIG. 4) directed in a lateral direction of the electronic instrument 1. The vertical portion 61 is contiguous with the other end of the arm portion 60 to rise upward therefrom.

The first arm 58 has two first driving pins 62 as the first projecting piece respectively at each end of the vertical portion 61. The first driving pins 62 are projected from the first arm 58 outward laterally in the chassis body 14 of the instrument body 2. The first driving pins 62 each are projected toward the first groove 23c formed on the one face 23b of the cam gear 23.

The first driving pins 62 extend respectively through the hole 43 or 44 of the first guide hole 57a when assembled with the first arm 58 which is positioned inside the first frame 57 within the chassis body 14. Furthermore, the first driving pins 62 are respectively received in the cam groove 33 or the cam groove 34 of the cam gear 23. The upper first driving pin 62 is extended through the hole 43 of the first guide hole 57a, so that the first arm 58 is supported by the arc segment 46 turnably around a turning center T (shown by a chain line in FIGS. 4, 5, 8, 15, and 22). Thus, the first arm 58 is turnably supported by the first frame 57, i.e. by the chassis 5.

The supporting arm 59 is unitarily formed with the first holder 40 and has a side surface of an arc shape extending in a longitudinal direction of the electronic instrument 1. The supporting arm 59 extends from an upper end of the first holder 40 at each side end of the first holder 40 inward in the instrument body 2. That is, the supporting arm 59 extends from the first holder 40 constituting the first operation unit into the instrument body 2. The supporting arm 59 is positioned laterally inside the first frame 57 within the chassis body 14.

The supporting arm 59 has a supporting pin 63 at its end 59a distal from the first holder 40. The supporting pin 63 is projected from the supporting arm 59 to extend outward in the chassis body 14 along a lateral direction of the instrument body 2. The supporting pin 63 is received in the supporting hole 45 when the supporting arm 59 is positioned inside the first arm 58 in the chassis body 14. That is, the end 59a of the supporting arm 59 is received in the supporting hole 45 which is a guide channel.

The first groove 23c, the first driving pin 62, and the first frame 57 correspond to the first drive device described in the summary of the invention. The first arm 58 is supported by the first frame 57, i.e. by the chassis 5 turnably around the turning center T.

As illustrated in FIG. 4, the second drive section 17 has a second arm 36 as a second supporting member, a third arm 37 as a second turnable supporting member, a second guide hole 41, and a third guide hole 42.

Figure 10:
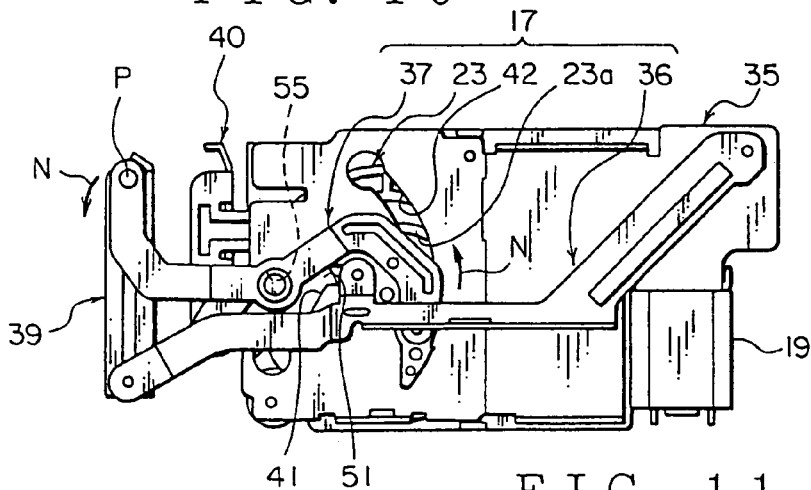
FIG. 10 is a side view taken along arrow A of FIG. 8 to show the second frame, a second arm, and a third arm with the relative positions thereof.

As illustrated in FIGS. 4 and 10, the locking hook 26 extends inward from a side of the front panel 15 of the instrument body 2 into the chassis body 14. The second arm 36 is laterally positioned outward from the second frame 35 within the chassis body 14.

The second arm 36 has an end positioned in the side of the front panel 15 for supporting a lower end of the second holder 39. The lower end of the second holder 39 is supported by the second arm 36 turnably around a lateral direction of the instrument body 2 and slidably in a vertical direction of the instrument body 2.

The second arm 36 has a second driving pin 54, which is the second projecting piece described in the invention summary, both at a middle and at a distal end thereof. The second driving pin 54 is projected from the second arm 36 inward laterally in the chassis body 14 of the instrument body 2. The second driving pin 54 is projected toward the second groove 31 formed in the other face 23a of the cam gear 23.

Each second driving pin 54 extends through the second guide hole 41 when assembled with the second arm 36, which is positioned outside the second frame 35 within the chassis body 14. Furthermore, the second driving pin 54 provided at the middle of the second arm 36 is received in the second groove 31 of the cam gear 23. Thus, the second arm 36 is supported movably along the second guide hole 41.

Thereby, when the second arm 36 moves from the first position along the ejecting direction of the CD of the recording medium received in the instrument body 2, the second arm 36 moves gradually downward along the arc segment 52 in a direction apart from the third arm 37. On the contrary, when the second arm 36 moves from the second position along the insertion direction of the CD into the instrument body 2, the second arm 36 moves gradually upward along the arc segment 52 in a direction toward the third arm 37. Thus, the movement of the second arm 36 along the ejecting or insertion direction of the CD of the recording medium causes the third arm 37 to come away from or close to the third arm 37.

As illustrated in FIGS. 4 and 10, the third arm 37 extends inward from a side of the front panel 15 of the instrument body 2 into the chassis body 14. The third arm 37 is laterally positioned outward from the second frame 35 within the chassis body 14 and above the second arm 36. The third arm 37 has an end positioned in the side of the front panel 15 for supporting an upper end of the second holder 39. The upper end of the second holder 39 is supported by the third arm 37 turnably around a turning axis P (shown by a chain line in FIG. 4) oriented in a lateral direction of the instrument body 2.

The third arm 37 has a through hole 55 at a middle thereof, and the through hole 55 receives the supporting pin 38a. The third arm 37 is supported by the supporting pin 38a turnably around the supporting pin 38a and the through hole 55. That is, the third arm 37 is turnably supported by the second frame 35.

The third arm 37 has a third driving pin 56 as the third projecting piece.

The third driving pin 56 is projected from the third arm 37 in a lateral direction of the instrument body 2 inward within the chassis body 14 to be opposed to the third groove 32 formed in the other face 23a of the cam gear 23. The third driving pin 56 extends through the third guide hole 42 to be received in the third groove 32 of the cam gear 23 when the third arm 37 is positioned outside the second frame 35 within the chassis body 14.

The second groove 31, the third groove 32, the second driving pin 54, the third driving pin 56, the second guide hole 41, and the third guide hole 42 correspond to the second drive device. The second drive device turns the third arm 37 around the supporting pin 38a since the third arm 37 is turnably supported by the second frame 35, i.e. by the chassis 5. Thus, the second drive device supports the second arm 36 movably along the insertion or ejecting direction of the CD through the recording medium inserting slot 7.

The normal rotation of the motor 19 actuates the first driving unit 24 to turn the cam gear 23 to move the second operation unit 3, the second holder 39, the first operation unit 4, and the first holder 40 from the first position via the second position to the third position. On the contrary, the reserve rotation of the motor 19 moves the second operation unit 3, the second holder 39, the first operation unit 4, and the first holder 40 from the third position via the second position to the first position.

The first arm 58 is turned around the turning center T (shown by a chain line in FIGS. 8, 15, and 22) by the first drive section consisting of the first groove 23c, the vertical portion 61, and the first guide hole 57a. Thereby, the first drive section moves the first operation unit 4 and the first holder 40 between the first position and the second position. The turning center T directs laterally in the electronic instrument 1 through the center of the driving mechanism 6.

The turning of the first arm 58 around the turning center T by the first drive section moves the supporting pin 63, which is provided at the end 59a of the supporting arm 59, along the supporting hole 45. Thus, the first drive section moves the supporting arm 59 along the supporting hole 45.

The second arm 36 is further moved along the insertion or ejection direction of the CD through the recording medium inserting slot 7 of the instrument body 2 by the second drive device which is constituted by the second groove 31, the third groove 32, the second driving pin 54, the third driving pin 56, the second guide hole 41, and third guide hole 42. Thereby, the second drive device turns the third arm 37, and the second arm 36 comes close to or comes apart from the third arm 37. Thus, the second drive device moves the second operation unit 3 and the second holder 39 between the first position and the second position.

The second driving unit 25 has almost the same configuration as the first driving unit 24 except that the second driving unit 25 is not provided with the motor 19, the worm 20, the worm gear 21, the transmission gear 22, etc. In addition, the first driving unit 24 and the second driving unit 25 are mechanically connected to each other by a link rod 64 as illustrated in FIGS. 4 and 5.

The link rod 64 is supported by the chassis body 14 turnably around a central axis of the link rod 64. The link rod 64 includes a rod body 65 and a link gear 66 provided at each end of the rod body 65. The central axis of the link rod 64 is oriented along a lateral direction of the electronic instrument 1. The link gears 66 engage respectively with the cam gear 23 of the first driving unit 24 or the cam gear 23 of the second driving unit 25. Thus, the rotation of the motor 19 of the first driving unit 24 turns the cam gear 23 of the first driving unit 24 and the cam gear 23 of the second driving unit 25.

Next, an operation of the driving mechanism 6 having the aforementioned configuration will be discussed. As illustrated in FIGS. 9 and 10, at the first position, the two second driving pins 54 of the second arm 36 are respectively located at an inner end of the associated horizontal segment 51 of the second guide hole 41 of the second frame 35 within the instrument body 2. The second driving pin 54 formed at the middle of the second arm 36 is located at an end of the second groove 31 which is in the side of the turning center Q of the cam gear 23.

The third driving pin 56 of the third arm 37 is located at a lower end of the third guide hole 42 of the second frame 35. The third driving pin 56 is located at an end of the third groove 32 which is in the side of the rotating center Q of the cam gear 23.

Figure 12:
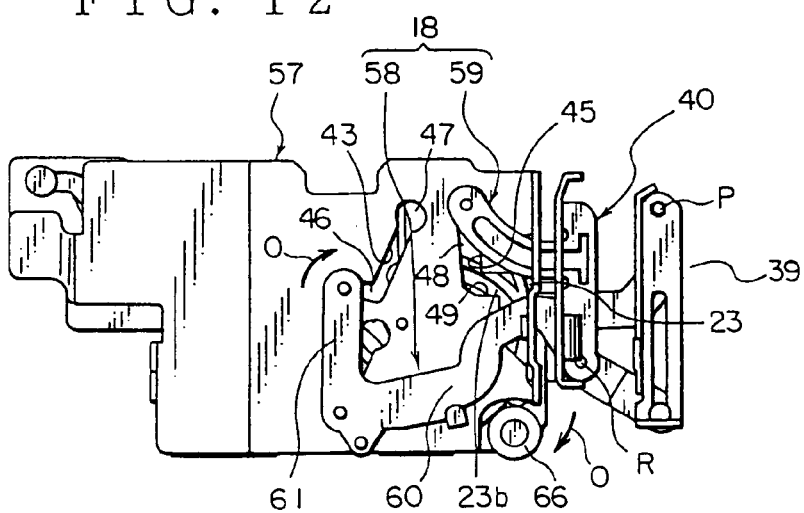
FIG. 12 is a side view taken along arrow B of FIG. 8 to show the first frame, a first arm, and a supporting arm with the relative positions thereof.

As illustrated in FIGS. 11 and 12, at the first position, the first driving pin 62 (referred to as an upper first pin) provided at an upper end of the vertical portion 61 of the first arm 58 is located at an inner end of the arc segment 46 of the hole 43 of the first frame 57 within the instrument body 2. The upper first driving pin 62 is also located at an inner end of the cam groove 33 of the cam gear 23 within the instrument body 2.

The first driving pin 62 (referred to as a lower first pin hereinafter) provided at a lower end of the vertical portion 61 of the first arm 58 is located at an inner end of the arc segment 34a of cam groove 34 which is in a distal side of the spiral portion 34b. The lower first driving pin 62 is also located in the hole 44. The supporting pin 63 of the supporting arm 59 is located at an upper end of the first vertical segment 48 of the first frame 57.

Thus, as illustrated in FIGS. 6 and 7, the exposed faces 8a and 11a of the second operation unit 3 and the first operation unit 4 are disposed parallel to the surface 15a of the front panel 15. The exposed face 11a is positioned between the second operation unit 3 and the front panel 15. That is, the first operation unit 4 is covered by the front panel 15 and the second operation unit 3. The recording medium inserting slot 7 is closed by the second operation unit 3 and the first operation unit 4. As illustrated in FIG. 8, the second holder 39 and the first holder 40 are aligned with each other in a direction shown by arrow Z, and the second holder 39 is positioned in a forward side of the first holder 40.

The normal rotation of the motor 19 turns the cam gear 23 along arrow L shown in FIGS. 9 and 11, so that the second driving pin 54 moves to a peripheral portion of the cam gear 23. Because, the second groove 31 is spiral so as to gradually come close to the peripheral portion and to gradually come away from the rotating center Q of the cam gear 23.

At the same time, the second driving pin 54 moves along horizontal segment 51 of the second guide hole 41 toward the user, and then the second driving pin 54 moves downward along the arc segment 52. The second arm 36 moves along a direction for ejecting the CD from the recording medium inserting slot 7 to gradually come away from the third arm 37.

Furthermore, the third driving pin 56 moves to a peripheral portion of the cam gear 23. Because, the third groove 32 is spiral so as to gradually come close to the peripheral portion and to gradually come away from the rotating center Q of the cam gear 23. At the same time, the third driving pin 56 moves upward along the third guide hole 42, and then the third arm 37 turns along arrow N of FIG. 10.

Thus, the second holder 39, i.e. the second operation unit 3 moves in a direction perpendicular to the surface 15a of the front panel 15 to come away from the instrument body 2, and then the second operation unit 3 moves downward from the instrument body 2. Then, the second arm 36 moves gradually apart from the third arm 37, and the third arm 37 turns along arrow N of FIG. 10 so that the exposed face 8a turns around the turning axis P to face upward.

At the first position, the normal rotation of the motor 19 turns the cam gear 23 along arrow L shown in FIGS. 9 and 11, so that the first driving pin 62 moves along the arc segment 46 around the first driving pin 62 to reach an end of the arc segment 46 located in the side of the front panel 15, while the first driving pin 62 is positioned at a lower end of the hole 44. Because, the lower first driving pin 62 of the first arm 58 is positioned in the arc segment 34a of the cam groove 34, and the upper first driving pin 62 is positioned in the arc segment 46 of the hole 43.

Thus, the first arm 58 turns around the rotating center T along arrow O (FIG. 12). The first holder 40, i.e. the first operation unit 4 moves downward relative to the length of the arc segment 46. At the same time, the supporting pin 63 of the supporting arm 59 moves downward along the first vertical segment 48. That is, the supporting pin 63 of the supporting arm 59 moves along the supporting hole 45.

Thus, the second operation unit 3 and the second holder 39 move from the first position in a direction perpendicular to the surface 15a of the front panel 15 to come away from the instrument body 2, and then the second operation unit 3 slides downward from the instrument body 2, so that the exposed face 8a turns a little to face upward as illustrated in FIGS. 13 and 14. The first operation unit 4 moves downward to expose the recording medium inserting slot 7 as illustrated in FIGS. 13 and 14. Thereby, the second operation unit 3 and the first operation unit 4 are moved from the first position to the second position.

Figure 17:
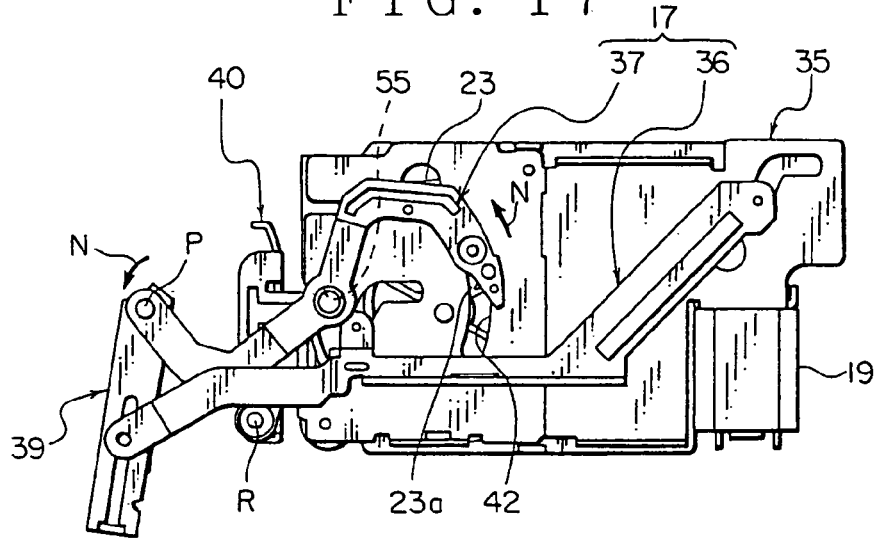
FIG. 17 is a side view taken along arrow C of FIG. 15 to show the second frame, the second arm, and the third arm with the relative positions thereof.

At the second position, as illustrated in FIGS. 16 and 17, the two second driving pins 54 of the second arm 36 are respectively at a middle portion of each arc segment 52 of the second guide hole 41 formed in the second frame 35. The second driving pin 54 provided on the middle of the second arm 36 is positioned at a middle portion of the second groove 31.

The third driving pin 56 of the third arm 37 is positioned at a middle portion of the third guide hole 42 of the second frame 35 and is also positioned at a middle portion of the third groove 32.

Figure 18:
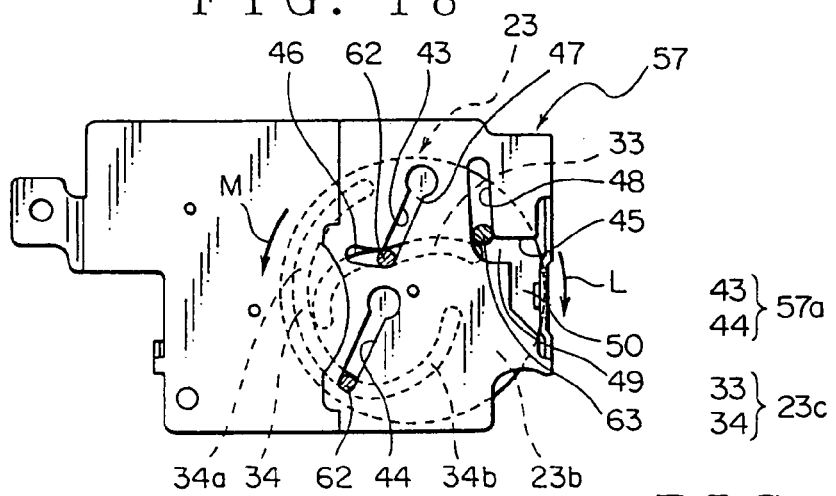
FIG. 18 is a side view taken along arrow D of FIG. 15 to show the first frame and the cam gear with the relative positions thereof.
Figure 19:
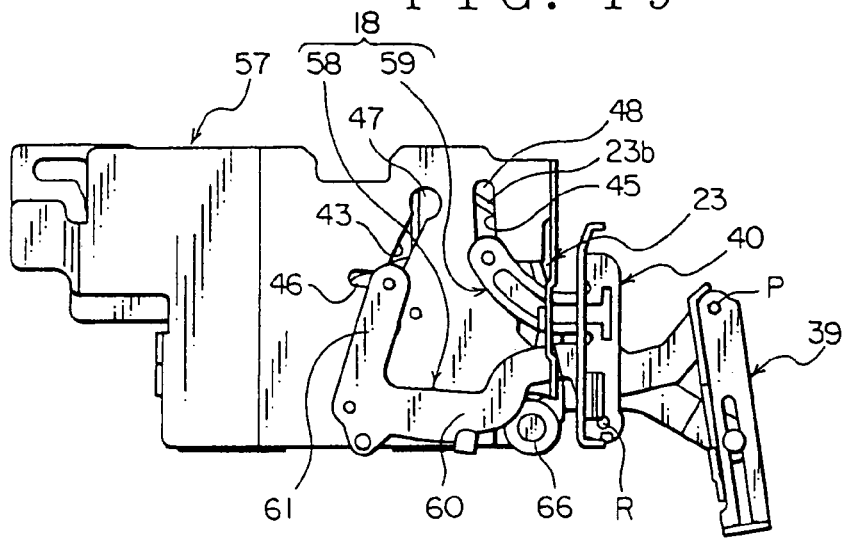
FIG. 19 is a side view taken along arrow D of FIG. 8 to show the first frame, a first arm, and a supporting arm with the relative positions thereof.

As illustrated in FIGS. 18 and 19, at the second position, the upper first driving pin 62 of the first arm 58 is located at an end of the arc segment 46 of the hole 43 of the first frame 57 in the side of the front panel 15. The upper first driving pin 62 is also located at a middle portion of the cam groove 33 of the cam gear 23.

The lower first driving pin 62 is located at an end of the arc segment 34a of cam groove 34 in the side of the spiral portion 34b. The lower first driving pin 62 is also located at a lower end of the hole 44. The supporting pin 63 of the supporting arm 59 is located at a lower end of the first vertical segment 48 of the supporting hole 45 provided in the first frame 57.

Thus, the second operation unit 3 and the first operation unit 4 move downward from the first position in a direction perpendicular to the surface 15a of the front panel 15 to expose the recording medium inserting slot 7 as illustrated in FIGS. 13 and 14. Thereby, the exposed face 8a of the second operation unit 3 is exposed toward the user. However, the exposed face 11a of the first operation unit 4 is still partially covered by the second operation unit 3.

Figure 15:
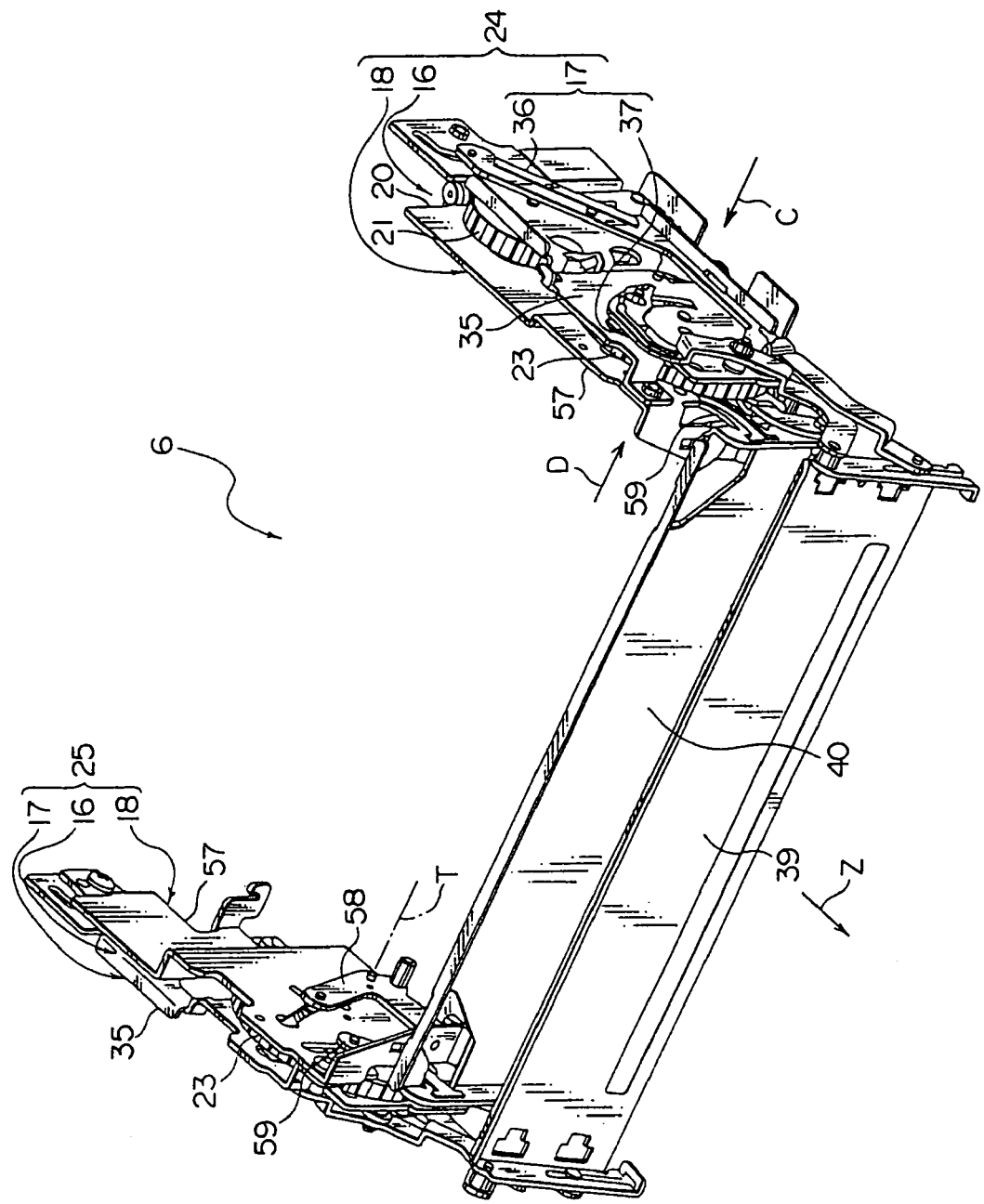
FIG. 15 is a perspective view showing the electronic instrument of FIG. 1, in which the first holder and the second holder have moved to the second position.

As illustrated in FIG. 15, the second holder 39 and the first holder 40 are moved downward from the first position, and the second holder 39 is positioned lower than the first holder 40.

A further normal rotation of the motor 19 turns the cam gear 23 along arrow L shown in FIGS. 16 and 18, so that the second driving pin 54 moves to a peripheral portion of the cam gear 23. Because, the second groove 31 is spiral so as to gradually come close to the peripheral portion and to gradually come away from the rotating center Q of the cam gear 23, and the second driving pin 54 is positioned in a middle portion of the second groove 31.

Furthermore, the third driving pin 56 moves to a peripheral portion of the cam gear 23. Because, the third groove 32 is spiral so as to gradually come close to the peripheral portion and to gradually come away from the rotating center Q of the cam gear 23, and the third driving pin 56 is positioned in a middle portion of the third groove 32. At the same time, the third driving pin 56 moves further upward along the third guide hole 42, and then the third arm 37 turns along arrow N of FIG. 17.

Thus, the second holder 39, i.e. the second operation unit 3 moves downward from the second position in a forward direction of the instrument body 2 to come away from the instrument body 2. With the further movement of the second arm 36 in a forward direction of the instrument body 2, the third arm 37 further turns along arrow N of FIG. 10 so that the exposed face 8a further turns around the turning axis P to face upward.

At the second position, a further normal rotation of the motor 19 turns the cam gear 23 along arrow L shown in FIGS. 16 and 18, so that the first driving pin 62 of the first arm 58 moves upward along the slope segment 47 of the hole 43 and the hole 44. Because, the lower first driving pin 62 of the first arm 58 is positioned at an end of the arc segment 34a of the cam groove 34 in the side of the spiral portion 34b.

Thus, the first arm 58 moves upward along the slope segment 47 of the hole 43 and the hole 44 in a forward direction of the instrument body 2. At the same time, the supporting pin 63 of the supporting arm 59 moves upward within the first vertical segment 48.

The slope segment 47 of the hole 43 and the hole 44 incline upward to gradually come close to the first vertical segment 48, and the first vertical segment 48 inclines upward to gradually come close to the hole 43. An lower end of the first holder 40 moves forward of the instrument body 2, and an upper end of the first holder 40 moves toward the front panel 15. The first operation unit 4 turns around the turning axis R so that the exposed face 11a turns further upward.

Thus, as illustrated in FIGS. 20 and 21, the second operation unit 3 and the second holder 39 slide from the second position to move forward and downward relative to the instrument body 2, while the exposed face 8a turns to face upward. At the same time, as illustrated in FIGS. 20 and 21, the first operation unit 4 slides upward while the exposed face 11a turns to face upward. Accordingly, the second operation unit 3 and the first operation unit 4 are moved from the second position to third position.

Figure 24:
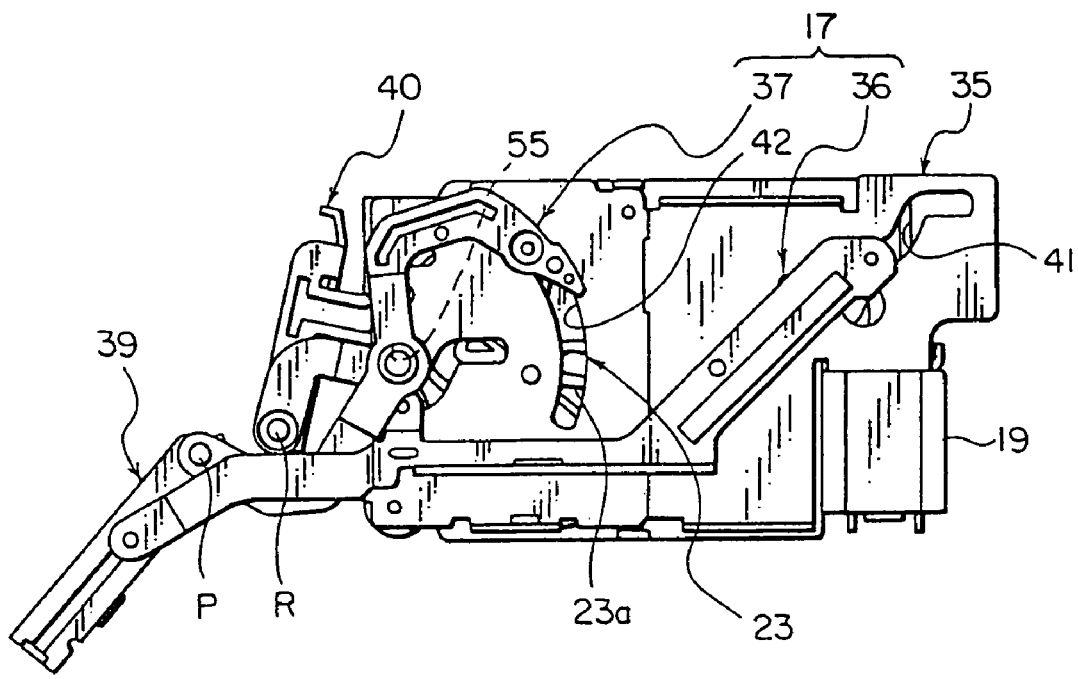
FIG. 24 is a side view taken along arrow E of FIG. 22 to show the second frame, the second arm, and the third arm with the relative positions thereof.

At the third position, as illustrated in FIGS. 23 and 24, the two second driving pins 54 of the second arm 36 are respectively positioned at an end of the arc segment 52 of each second guide hole 41 formed in the second frame 35 in the side of the vertical portion 53. The second driving pin 54 provided at the middle of the second arm 36 is positioned at an end of the second groove 31 in the side of the rotating center Q of the cam gear 23.

The third driving pin 56 of the third arm 37 is positioned at an upper end of the third guide hole 42 of the second frame 35. Furthermore, the third driving pin 56 is positioned at an end the third groove 32 in the side apart from the rotating center Q of the cam gear 23.

Figure 25:
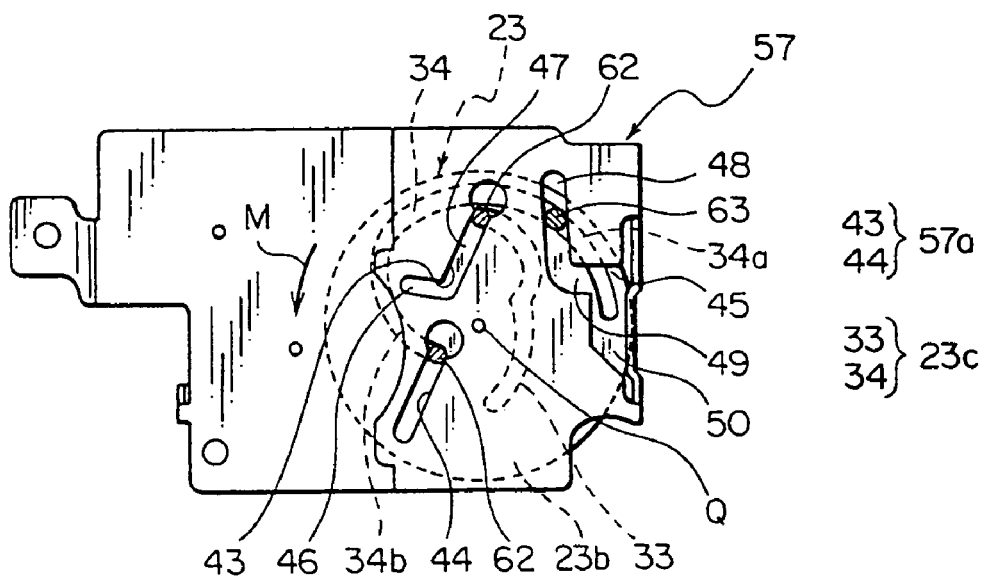
FIG. 25 is a side view taken along arrow F of FIG. 22 to show the first frame and the cam gear with the relative positions thereof.
Figure 26:
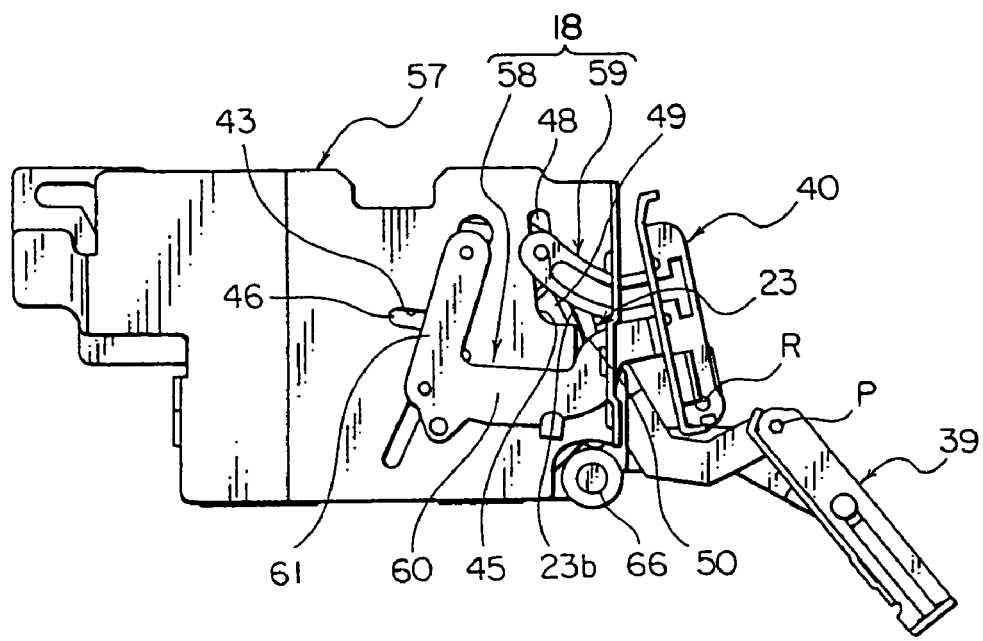
FIG. 26 is a side view taken along arrow F of FIG. 22 to show the first frame, the first arm, and the supporting arm with the relative positions thereof.

At the third position, as illustrated in FIGS. 25 and 26, the upper first driving pin 62 of the first arm 58 is positioned at an upper end of the slope segment 47 of the hole 43 formed in the first frame 57. The lower first driving pin 62 is positioned at an end of the spiral portion 34b of the cam groove 34 in the side of the rotating center Q of the cam gear 23. The lower first driving pin 62 is positioned at an upper end of the hole 44. The supporting pin 63 of the supporting arm 59 is positioned in the first vertical segment 48 of the supporting hole 45 formed in the first frame 57.

Thus, as illustrated in FIGS. 20 and 21, the second operation unit 3 further moves downward from the second position, and the first operation unit 4 moves upward from the second position. The second operation unit 3 and the first operation unit 4 turns so that the exposed faces 8a and 11a are oriented upward. Thus, the exposed faces 8a and 11a are exposed to the user so that the user can see well the display surfaces of the LCDs 9 and 12.

Figure 22:
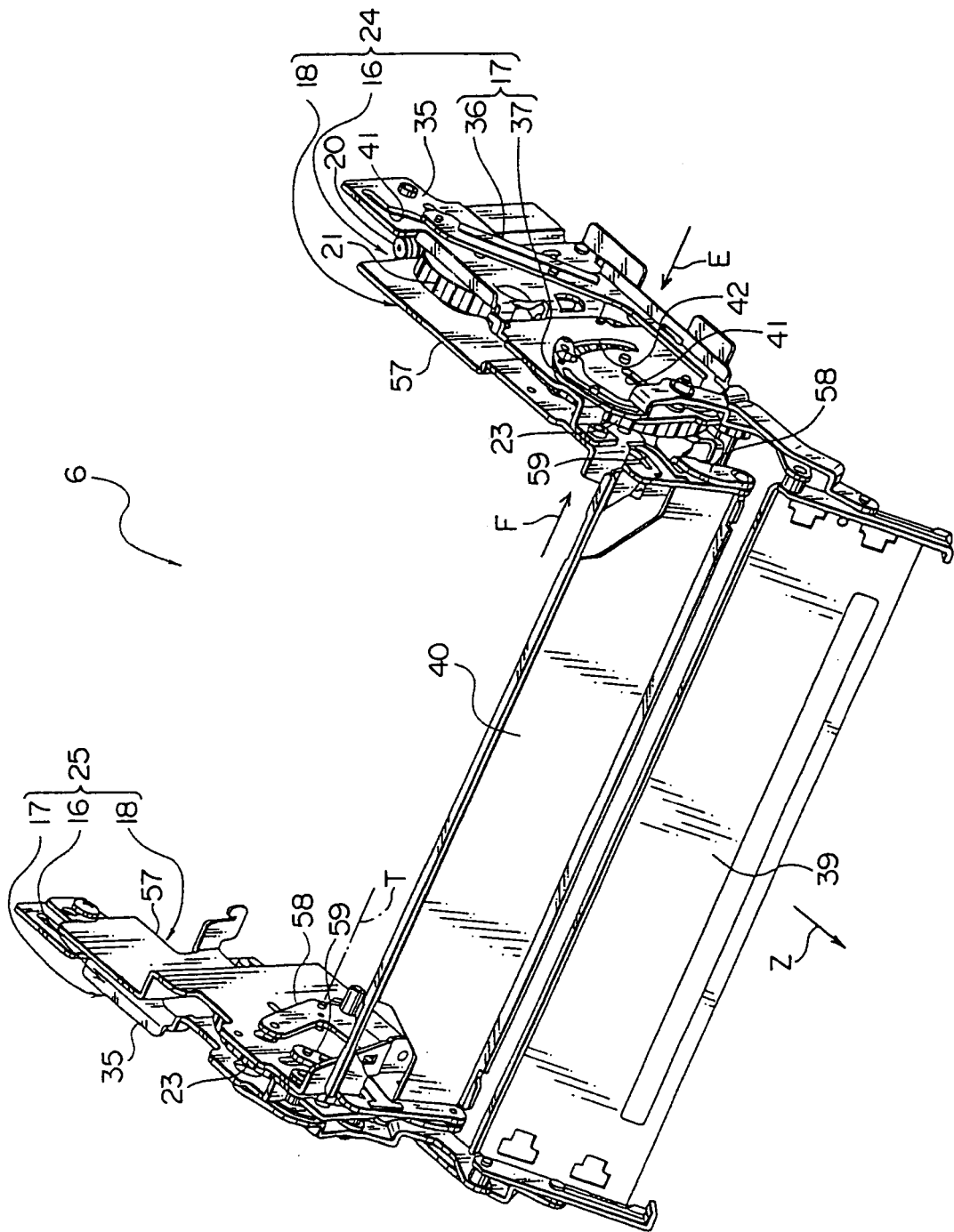
FIG. 22 is a perspective view showing the electronic instrument of FIG. 1, in which the first holder and the second holder have moved to the third position.

As illustrated in FIG. 22, the second holder 39 further moves downward from the second position, and the first holder 40 moves upward from the second position, so that the second holder 39 is positioned lower than the first holder 40.

For the movement from the third position to the second position, a reverse rotation of the motor 19 turns the cam gear 23 along arrow M of FIGS. 16, 18, 23, and 25 which is a direction opposed to arrow L.

Thus, the second operation unit 3 and the first operation unit 4 each move relative to the instrument body 2 between the first position to cover the recording medium inserting slot 7 and the second position to expose the recording medium inserting slot 7. The second operation unit 3 and the first operation unit 4 can be moved relative to the instrument body 2 to reach the third position to expose the faces 8a and 11a for the user.

The second holder 39, i.e. the second operation unit 3 moves downward relative to the instrument body 2 from the first position to second position. Furthermore, the second operation unit 3 moves downward relative to the instrument body 2 from the second position to the third position.

The first holder 40, i.e. the first operation unit 4 moves downward relative to the instrument body 2 from the first position to the second position. Furthermore, the first operation unit 4 moves upward from the second position to the third position.

At the second and third positions, the second holder 39, i.e. the second operation unit 3 turns around the turning axis P laterally extending within the electronic instrument 1 so that the exposed face 8a faces upward. At the third position, the first holder 40, i.e. the first operation unit 4 turns around the turning axis R laterally extending within the electronic instrument 1 so that the exposed face 11a is oriented upward.

In the electronic instrument 1, the second operation unit 3 can be removed from the second holder 39 at the second position or at the third position. In the removed state, the reverse rotation of the motor 19 moves the second holder 39 toward the first position. The first operation unit 4 is positioned between the second holder 39 and the front panel 15, while the second holder 39 and the first operation unit 4 are aligned with each other in a direction perpendicular to the surface 15a of the front panel 15. Thus, when the second operation unit 3 is removed from the second holder 39, the second holder 39 and the front panel 15 cover the first operation unit 4, but the electronic instrument 1 itself is not ready to be used.

In the embodiment, for moving the first holder 40 and the first operation unit 4 between the first position and the second position, there are provided the supporting arm 59 extended toward the instrument body 2 unitarily from the first holder 40 and the first arm 58 turnably supported by the first frame 57. Furthermore, for moving the supporting arm 59 and the first arm 58, there are provided the supporting hole 45 and the first guide hole 57a.

Thus, the simple configurations of the supporting arm 59 unitarily formed with the first holder 40 and the first arm 58 can move the first holder 40 and the first operation unit 4. This prevents an increase in number of parts and in a manufacturing cost of the electronic instrument 1. The supporting arm 59 is unitary with the first holder 40 to move together.

The first groove 23c formed in the one face 23b of the cam gear 23 receives the first driving pin 62 protruded from the first arm 58 through the first guide hole 57a. The turning of the cam gear 23 moves the first driving pin 62 along the first guide hole 57a, so that the first holder 40 and the first operation unit 4 surely move between the first position and the second position.

When the second holder 39 and the second operation unit 3 move from the first position to the second position, the second arm 36 moves along the ejecting direction of the CD of the recording medium so that the second arm 36 comes apart from the third arm 37 and the third arm 37 is turned. Thus, when the second holder 39 and the second operation unit 3 move from the first position to the second position, the second holder 39 and the second operation unit 3 incline in a direction to cause the second arm 36 to come close to the third arm 37, i.e. upward in the illustrated example.

Therefore, at the second position, the exposed face 8a of the second operation unit 3 is easily exposed to the user, so that the LCD 9 provided on the exposed face 8a can surely display information so as to be surely visually recognized by the user. That is, the user can reliably visually recognize an operation status of the electronic instrument 1 through the display of the LCD 9.

The second groove 31 formed in the other face 23a of the cam gear 23 receives the second driving pin 54 of the second arm 36 through the second guide hole 41, while the third groove 32 receives the third driving pin 56 of the third arm 37 through the third guide hole 42.

The turning of the cam gear 23 moves the second driving pin 54 along the second guide hole 41 and moves the third driving pin 56 along the third guide hole 42. Thus, the user can well visually recognize an operation status of the electronic instrument 1 and can surely move the second holder 39 and the second operation unit 3 between the first position and the second position.

For moving the first holder 40 and the first operation unit 4, there is provided the first groove 23c formed in the one face 23b of the cam gear 23, and for moving the second holder 39 and the second operation unit 3, there are provided the second groove 31 and the third groove 32 which are formed in the other face 23a of the cam gear 23.

Thereby, the turning of the cam gear 23 moves the first holder 40 and the second holder 39 between the first position and the second position with a desired timing and synchronization thereof. Both the one face 23b and the other face 23a of the cam gear 23 are formed with the cam grooves, decreasing the electronic instrument 1 in number of parts and in a manufacturing cost thereof.

At the third position, the exposed faces 8a and 11a of the second operation unit 3 and the first operation unit 4 are exposed, so that the exposed faces 8a and 11a can have respectively a larger display area which is better for recognition of an operation status of the electronic instrument 1 by the user.

The second operation unit 3 can be provided with the switch 10 for selection of a broadcasting station received by the AM/FM tuner, and the first operation unit 4 can be provided with the switch 13 for selection of a piece of music reproduced by the CD player. That is, a larger effective operation section area is achieved.

When the second operation unit 3 is removed from the second holder 39, the second holder 39 and the first operation unit 4 move so that the first operation unit 4 is positioned between the second holder 39 and the instrument body 2. In the removed state of the second operation unit 3, the second holder 39 and the first operation unit 4 cover the front panel 15.

In the removed state of the second operation unit 3, the electronic instrument 1 itself can not be used, providing a burglarproof of the electronic instrument 1.

In the aforementioned embodiment, the first operation unit 4 moves upward on the way from the second position to the third position while the second operation unit 3 is moved downward. However, the first operation unit 4 may be moved upward after the instrument body 2 has reached at its lowest point on the way from the first position to the third position.

Thereby, at the third position, it can be surely prevented that the exposed face 8a of the second operation unit 3 and the exposed face 11a of the first operation unit 4 overlap one another. This allows a sure recognition of the exposed faces 8a and 11a by the user. Thus, the user can surely visually recognize information displayed on the LCD 9 and the LCD 12 provided on the exposed faces 8a and 11a and can operate the switches 10 and 13.

Figure 27:
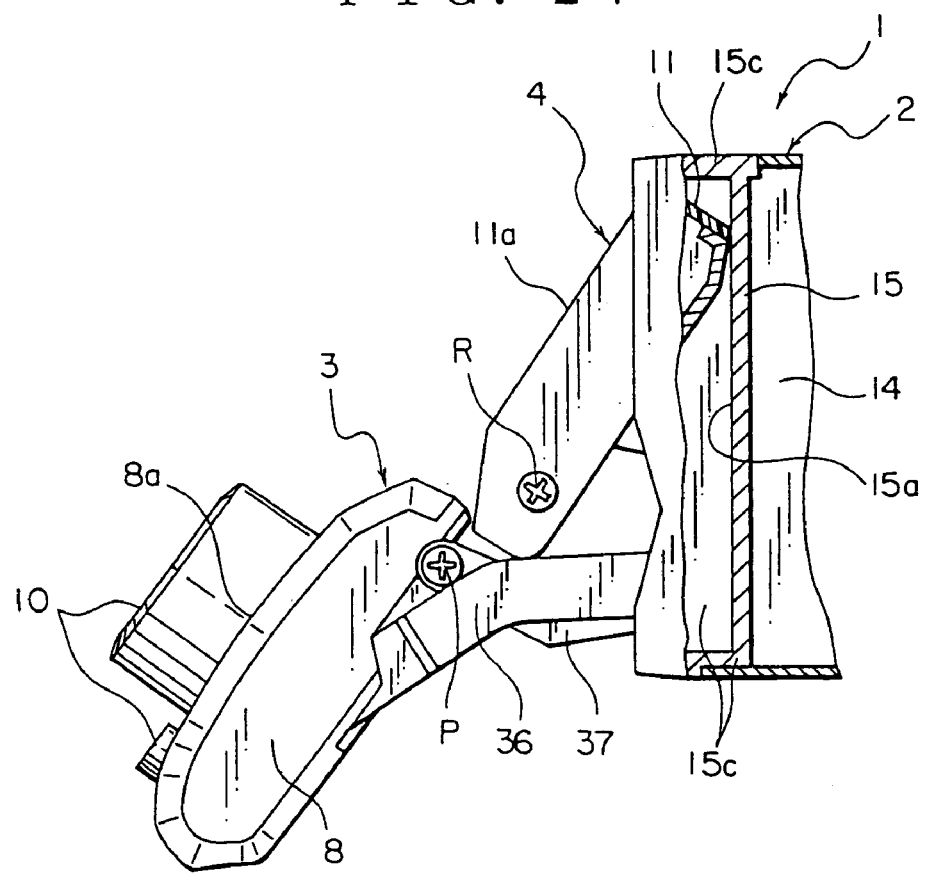
FIG. 27 is a side view partially in section showing an electronic instrument of a modified embodiment according to the present invention, in which the first operation unit and the second operation unit have moved to the third position.
Figure 28:
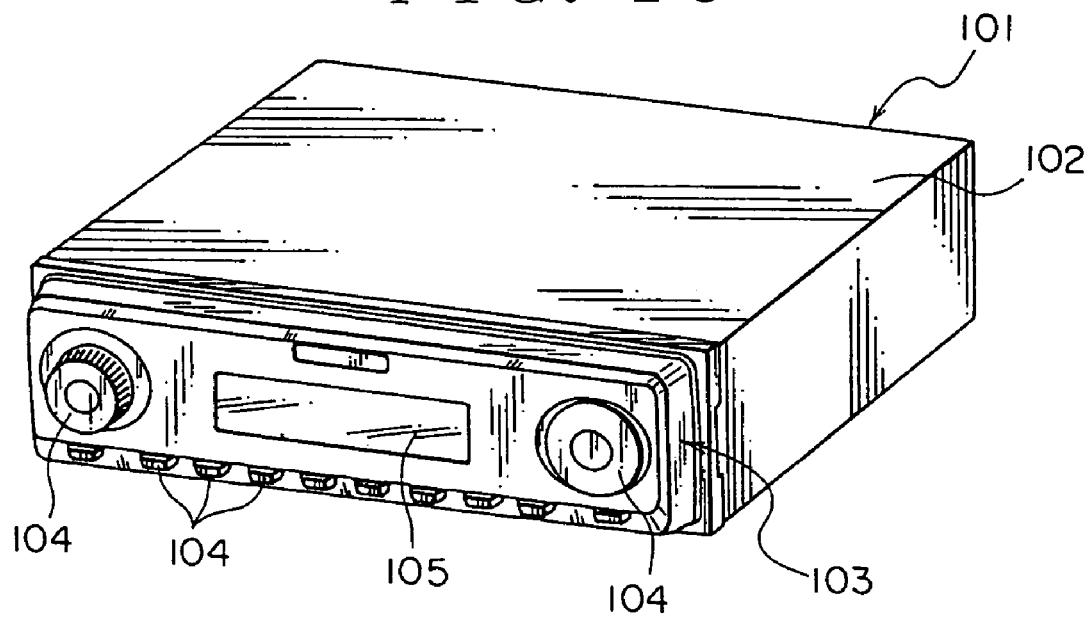
FIG. 28 is a perspective view showing a conventional electronic instrument.
Figure 29:
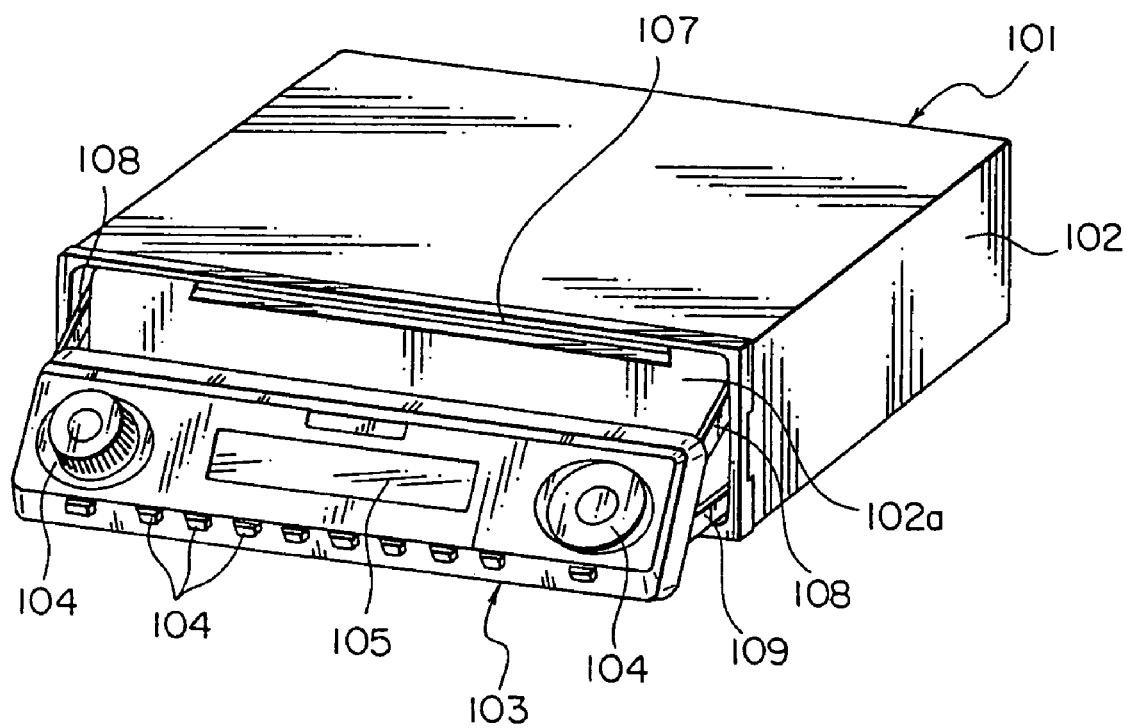
FIG. 29 is a perspective view showing the electronic instrument of FIG. 28, in which an operation unit is moved to a second position.
Figure 30:
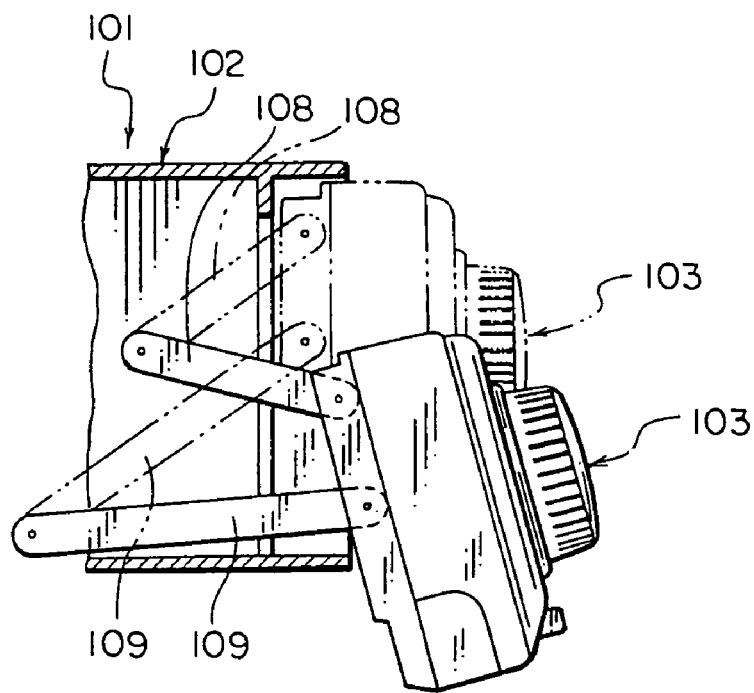
FIG. 30 is an illustration showing a movement range of the operation unit of the electronic instrument of FIG. 28.
Figure 31:
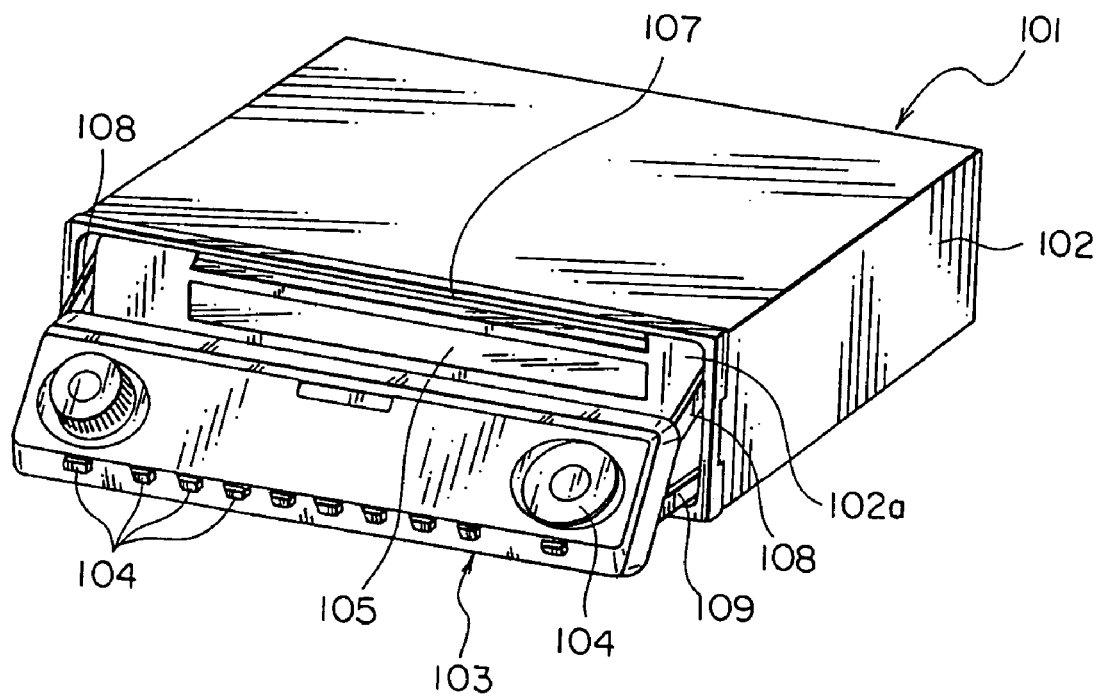
FIG. 31 is a perspective view showing another conventional electronic instrument.

In the aforementioned embodiment, both the second operation unit 3 and the first operation unit 4 turn such that the exposed faces 8a and 11a face upward at the third position. However, in the present invention, the exposed faces 8a and 11a may be disposed to be parallel to each other at the third position as illustrated in FIG. 27, e.g. by a length modification of the arms 36, 37, and 58 as well as the supporting arm 59. Thereby, the user can more surely visually recognize information displayed on the LCD 9 and the LCD 12 provided on the exposed faces 8a and 11a. In FIG. 27, the same components as those of the aforementioned embodiment have the same reference numerals and will not be discussed again.

What is claimed is:

1. A driving mechanism of an electronic instrument having an instrument body formed with a recording medium inserting slot for inserting a recording medium into the instrument body, the driving mechanism moving a first operation unit and a second operation unit between a first position for covering the recording medium inserting slot and a second position for exposing the recording medium inserting slot, the driving mechanism comprising:
   a first turnable supporting member turnably fitted to the instrument body for supporting the first operation unit,
   a first drive device for turning the first turnable supporting member,
   a second supporting member for supporting the second operation unit,
   a second turnable supporting member turnably fitted to the instrument body for supporting the second operation unit, and
   a second drive device for turning the second turnable supporting member, the second drive device supporting the second supporting member movably in directions along which the recording medium is inserted and removed through the recording medium inserting slot of the instrument body,
   wherein the first drive device turns the first turnable supporting member to move the first operation unit between the first position and the second position, and the second drive device moves the second supporting member and turns the second turnable supporting member to move the second operation unit between the first position and the second position,
   wherein the first operation unit and the second operation unit respectively comprise at least one display for displaying information, and the first operation unit and the second operation unit are arranged in parallel to each other in front of the instrument body formed with the recording medium inserting slot.

2. The driving mechanism according to claim 1, wherein the first and second drive devices are moved by a primary driving unit.

3. The driving mechanism according to claim 1, wherein the first and second drive devices are moved against the instrument body into a third position, in which the each display of the first and second drive devices is exposed for the user.

4. A driving mechanism of an electronic instrument having an instrument body formed with a recording medium inserting slot for inserting a recording medium into the instrument body, the driving mechanism moving a first operation unit and a second operation unit between a first position for covering the recording medium inserting slot and a second position for exposing the recording medium inserting slot, the driving mechanism comprising:
   a first turnable supporting member turnable fitted to the instrument body for supporting the first operation unit,
   a first drive device for turning the first turnable supporting member,
   a second supporting member for supporting the second operation unit,
   a second turnable supporting member turnably fitted to the instrument body for supporting the second operation unit, and
   a second drive device for turning the second turnable supporting member, the second drive device supporting the second supporting member movably in direction along which the recording medium is inserted and removed the recording medium inserting slot of the instrument body,
   wherein the first device turns the first turnable supporting member to move the first operation unit between the first position and the second position, and the second drive device moves the second supporting member and turns the second turnable supporting member to move the second operation unit between the first position and the second position,
   wherein the first drive device includes:
   a first projecting piece projecting from the first turnable supporting member,
   a gear turned by a drive motor, the gear having a face formed with a first groove, and
   a first guide hole through which the first projecting piece passes such that the first projecting piece is received in the first groove,
   and the second drive device includes:
   a second projecting piece projecting from the second supporting member,
   a third projecting piece projecting from the second turnable supporting member,
   a second groove and a third groove which are formed in another face of the gear,
   a second guide hole through which the second projecting piece passes such that the second projecting piece is received in the second groove, and
   a third guide hole through which the third projecting piece passes such that the third projecting piece is received in the third groove,
   wherein the gear turns so that the first groove moves the first projecting piece along the first guide hole and the second groove moves the second projecting piece along the second guide hole while the third groove moves the third projecting piece along the third guide hole to move the first operation unit and the second operation unit between the first position and the second position.

5. A driving mechanism of an electronic instrument having an instrument body formed with a recording medium inserting slot for inserting a recording medium into the instrument body, the driving mechanism moving a first operation unit and a second operation unit between a first position for covering the recording medium inserting slot and a second position for exposing the recording medium inserting slot, the driving mechanism comprising:
- a first turnable supporting member turnably fitted to the instrument body for supporting the first operation unit,
- a first drive device for turning the first turnable supporting member,
- a second supporting member for supporting the second operation unit,
- a second turnable supporting member turnably fitted to the instrument body for supporting the second operation unit, and
- a second drive device for turning the second turnable supporting member, the second drive device supporting the second supporting member movably in directions along which the recording medium is inserted and removed through the recording medium inserting slot of the instrument body,
- a primary unit for moving the first and second drive devices, and a gear wherein the first and second drive devices are moved by the primary driving unit via the gear,
- wherein the first device turns the first turnable supporting member to move the first operation unit between the first position and the second position, and the second drive device moves the second supporting member and turns the second turnable supporting member to move the second operation unit between the first position and the second position.

6. The driving mechanism according to claim 5, wherein the first and second drive devices are moved with a desired timing and synchronization thereof by turning of the gear.

* * * * *